United States Patent
Shrestha et al.

(10) Patent No.: US 12,200,549 B2
(45) Date of Patent: Jan. 14, 2025

(54) TECHNIQUES FOR HANDOVER IN NON-TERRESTRIAL NETWORKS

(71) Applicant: QUALCOMM Incorporated, San Diego, CA (US)

(72) Inventors: Bharat Shrestha, San Diego, CA (US); Xiao Feng Wang, San Diego, CA (US); Liangping Ma, San Diego, CA (US); Umesh Phuyal, San Diego, CA (US); Changhwan Park, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 17/844,574

(22) Filed: Jun. 20, 2022

(65) Prior Publication Data

US 2023/0413131 A1 Dec. 21, 2023

(51) Int. Cl.
| | | |
|---|---|---|
| *H04W 36/00* | (2009.01) | |
| *H04W 36/32* | (2009.01) | |
| *H04W 56/00* | (2009.01) | |
| *H04W 72/1268* | (2023.01) | |
| *H04W 72/23* | (2023.01) | |

(52) U.S. Cl.
CPC ... *H04W 36/0058* (2018.08); *H04W 36/0077* (2013.01); *H04W 36/32* (2013.01); *H04W 56/0045* (2013.01); *H04W 72/1268* (2013.01); *H04W 72/23* (2023.01)

(58) Field of Classification Search
CPC ......... H04W 36/0058; H04W 36/0077; H04W 36/32; H04W 56/0045; H04W 72/1268; H04W 72/23; H04W 84/06; H04W 36/0072; H04B 7/18541
USPC ...................................................... 455/436
See application file for complete search history.

(56) References Cited

FOREIGN PATENT DOCUMENTS

| EP | 3799470 A1 | 3/2021 |
| EP | 4106404 A1 | 12/2022 |
| WO | WO-2021168665 A1 | 9/2021 |

OTHER PUBLICATIONS

Asia Pacific Telecom: "Discussion on Delay Difference on Measurements for NTN", 3GPP TSG RAN WG2#111-e, R2-2007955, 3rd Generation Partnership Project, Mobile Competence Centre, 650, Route Des Lucioles, F-06921 Sophia-Antipolis Cedex, France, vol. RAN WG2, No. e-Meeting, Aug. 17, 2020-Aug. 28, 2020, Aug. 7, 2020, XP051912576, 4 Pages, The Whole Document.

(Continued)

*Primary Examiner* — Tanmay K Shah
(74) *Attorney, Agent, or Firm* — Holland & Hart LLP

(57) ABSTRACT

Methods, systems, and devices for wireless communications are described. A user equipment (UE) may communicate with a first cell. The UE may receive a request to report one or more parameters associated with handover from the first cell to a second cell during a time period. The one or more parameters may include an estimated propagation delay between the UE and the second cell during the time period, an estimated rate of change in propagation delay during the time period, or both. The UE may transmit a message indicating the parameters in response to the request. The UE may receive an indication of an uplink grant occasion associated with the handover during the time period based on indicating the parameters.

30 Claims, 16 Drawing Sheets

(56) References Cited

OTHER PUBLICATIONS

Huawei., et al., "RACH-Less Handover for NTN," 3GPP TSG-RAN WG2 Meeting #107, R2-1910570, 3rd Generation Partnership Project, Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 16, 2019, XP051768346, 3 Pages, The Whole Document.
International Search Report and Written Opinion—PCT/US2023/022908—ISA/EPO—Sep. 19, 2023.

TECHNIQUES FOR HANDOVER IN NON-TERRESTRIAL NETWORKS

FIELD OF TECHNOLOGY

The following relates to wireless communications, including techniques for handover in non-terrestrial networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE). Some wireless communications systems may support non-terrestrial networks. For example, a satellite may communicate with a UE and forward some communications to another network entity such as a base station. However, such networks may experience relatively high signaling overhead and congestion.

SUMMARY

The described techniques relate to improved methods, systems, devices, and apparatuses that support techniques for handover in non-terrestrial networks. The described techniques may enable devices to perform handover from a source cell to a target cell (e.g., without a random access channel (RACH) procedure). For example, a user equipment (UE) and a network entity (e.g., one or more base stations, satellites, or both) may communicate in a system. The UE may communicate with a serving cell (e.g., a source cell) associated with the network entity. The devices may perform a handover operation from the serving cell to a target cell in accordance with the techniques described herein. For example, the UE and the network entity may exchange signaling to enable a conditional cell handover (e.g., a RACH-less cell handover). In some examples, the network entity may request the UE to report one or more parameters associated with the conditional cell handover. The parameters may indicate an estimated propagation delay, an estimated rate of change in the propagation below, or both, among other examples of parameters. The UE may transmit a report message indicating the parameters and receive an indication of an uplink grant. The UE may transmit a message indicating that the handover is complete to the target cell using the uplink grant (e.g., without performing a RACH procedure with the target cell due to the source cell forwarding information to the target cell for communications with the UE). Additionally, or alternatively, the UE may initiate RACH with the target cell based on one or more thresholds being satisfied.

A method for wireless communications at a user equipment (UE) is described. The method may include receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both, transmitting, to the first cell, a message indicating the one or more parameters in response to receiving the request, and receiving, from the first cell, an indication of an uplink grant occasion associated with the cell handover from the first cell to the second cell to be performed during the time period based on the one or more parameters.

An apparatus for wireless communications at a UE is described. The apparatus may include a processor, memory coupled with the processor, and instructions stored in the memory. The instructions may be executable by the processor to cause the apparatus to receive, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both, transmit, to the first cell, a message indicating the one or more parameters in response to receiving the request, and receive, from the first cell, an indication of an uplink grant occasion associated with the cell handover from the first cell to the second cell to be performed during the time period based on the one or more parameters.

Another apparatus for wireless communications at a UE is described. The apparatus may include means for receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both, means for transmitting, to the first cell, a message indicating the one or more parameters in response to receiving the request, and means for receiving, from the first cell, an indication of an uplink grant occasion associated with the cell handover from the first cell to the second cell to be performed during the time period based on the one or more parameters.

A non-transitory computer-readable medium storing code for wireless communications at a UE is described. The code may include instructions executable by a processor to receive, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both, transmit, to the first cell, a message indicating the one or more parameters in response to receiving the request, and receive, from the first cell, an indication of an uplink grant occasion associated with the cell handover from the first cell to the second cell to be performed during the time period based on the one or more parameters.

Some examples of the method, apparatuses, and non-transitory computer-readable medium described herein may further include operations, features, means, or instructions for transmitting the message or a second message indicating an estimated propagation delay for a second time period, the second time period occurring prior to the time period.

Some examples of the method, apparatuses, and non-transitory computer-readable medium described herein may further include operations, features, means, or instructions for transmitting the message indicating the one or more parameters indicating a location of the UE, a change in position of the UE, a velocity of the UE, a position of the first cell, a position of the second cell, or any combination thereof.

Some examples of the method, apparatuses, and non-transitory computer-readable medium described herein may further include operations, features, means, or instructions for receiving a second message or the request indicating an ephemeris of the second cell, a timing advance associated with the second cell, a time offset associated with the second cell, or any combination thereof, where transmitting the message indicating the one or more parameters may be based on receiving the second message.

Some examples of the method, apparatuses, and non-transitory computer-readable medium described herein may further include operations, features, means, or instructions for receiving a second message indicating an uplink resource for sending a report to the first cell, the uplink resource occurring prior to the time period.

Some examples of the method, apparatuses, and non-transitory computer-readable medium described herein may further include operations, features, means, or instructions for receiving a second request to perform a measurement of a synchronization signal block of the second cell.

Some examples of the method, apparatuses, and non-transitory computer-readable medium described herein may further include operations, features, means, or instructions for receiving a second message indicating one or more measurement parameters, the one or more measurement parameters indicating a synchronization signal block measurement timing configuration, a measurement gap, a measurement time, or a combination thereof and performing the measurement of the synchronization signal block in accordance with the one or more measurement parameters.

Some examples of the method, apparatuses, and non-transitory computer-readable medium described herein may further include operations, features, means, or instructions for determining a handover time associated with the cell handover based on the first cell being one of an earth fixed cell or an earth moving cell.

Some examples of the method, apparatuses, and non-transitory computer-readable medium described herein may further include operations, features, means, or instructions for receiving a second message indicating a timing advance for the second cell for the time period.

Some examples of the method, apparatuses, and non-transitory computer-readable medium described herein may further include operations, features, means, or instructions for determining that a difference between a calculated timing advance and the timing advance indicated by the second message satisfies a threshold and transmitting, to the second cell, a first message of a random access channel procedure based on the satisfied threshold.

Some examples of the method, apparatuses, and non-transitory computer-readable medium described herein may further include operations, features, means, or instructions for transmitting, to the second cell, a first message of a random access channel procedure based on the time period elapsing.

Some examples of the method, apparatuses, and non-transitory computer-readable medium described herein may further include operations, features, means, or instructions for determining whether an initial timing error for timing advance may be within half of a cyclic prefix (CP) for a target cell and releasing the uplink grant occasion or a handover resource based on determining the initial timing error may be not within half of the CP for the target cell.

Some examples of the method, apparatuses, and non-transitory computer-readable medium described herein may further include operations, features, means, or instructions for transmitting one or more messages in accordance with a feedback type associated with the uplink grant occasion.

Some examples of the method, apparatuses, and non-transitory computer-readable medium described herein may further include operations, features, means, or instructions for determining that one or more parameters satisfy one or more thresholds, the one or more parameters including a timing advance, a location of the UE, a quantity of uplink grant occasions including the uplink grant occasion, a valid time window associated with the uplink grant occasion, or any combination thereof and transmitting a first message of a random access channel procedure based on the satisfied one or more thresholds.

A method for wireless communications at a network entity associated with a first cell is described. The method may include transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both, receiving a message indicating the one or more parameters in response to the transmitted request, and transmitting an indication of an uplink grant occasion associated with the cell handover from the first cell to the second cell during to be performed during the time period based on the one or more parameters.

An apparatus for wireless communications at a network entity associated with a first cell is described. The apparatus may include a processor, memory coupled with the processor, and instructions stored in the memory. The instructions may be executable by the processor to cause the apparatus to transmit a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both, receive a message indicating the one or more parameters in response to the transmitted request, and transmit an indication of an uplink grant occasion associated with the cell handover from the first cell to the second cell during to be performed during the time period based on the one or more parameters.

Another apparatus for wireless communications at a network entity associated with a first cell is described. The apparatus may include means for transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both, means for receiving a message indicating the one or more parameters in response to the transmitted request, and means for transmitting an indication of an uplink grant occasion associated with the cell handover from the first cell to the second cell during to be performed during the time period based on the one or more parameters.

A non-transitory computer-readable medium storing code for wireless communications at a network entity associated with a first cell is described. The code may include instructions executable by a processor to transmit a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both, receive a message indicating the one or more parameters in response to the transmitted request, and transmit an indication of an uplink grant occasion associated with the cell handover from the first cell to the second cell during to be performed during the time period based on the one or more parameters.

Some examples of the method, apparatuses, and non-transitory computer-readable medium described herein may further include operations, features, means, or instructions for receiving the message or a second message indicating an estimated propagation delay for a second time period, the second time period occurring prior to the time period.

Some examples of the method, apparatuses, and non-transitory computer-readable medium described herein may further include operations, features, means, or instructions for receiving the message indicating the one or more parameters indicating a location of the UE, a change in position of the UE, a velocity of the UE, a position of the first cell, a position of the second cell, or any combination thereof.

Some examples of the method, apparatuses, and non-transitory computer-readable medium described herein may further include operations, features, means, or instructions for transmitting a second message or the request indicating an ephemeris of the second cell, a timing advance associated with the second cell, a time offset associated with the second cell, or any combination thereof, where transmitting the message indicating the one or more parameters may be based on receiving the second message.

Some examples of the method, apparatuses, and non-transitory computer-readable medium described herein may further include operations, features, means, or instructions for transmitting a second message indicating an uplink resource for sending a report to the first cell, the uplink resource occurring prior to the time period.

Some examples of the method, apparatuses, and non-transitory computer-readable medium described herein may further include operations, features, means, or instructions for transmitting a second request to perform a measurement of a synchronization signal block of the second cell.

Some examples of the method, apparatuses, and non-transitory computer-readable medium described herein may further include operations, features, means, or instructions for transmitting a second message indicating one or more measurement parameters, the one or more measurement parameters indicating a synchronization signal block measurement timing configuration, a measurement gap, a measurement time, or a combination thereof.

Some examples of the method, apparatuses, and non-transitory computer-readable medium described herein may further include operations, features, means, or instructions for determining a handover time associated with the cell handover based on the first cell being one of an earth fixed cell or an earth moving cell.

Some examples of the method, apparatuses, and non-transitory computer-readable medium described herein may further include operations, features, means, or instructions for transmitting a second message indicating a timing advance for the second cell for the time period.

Some examples of the method, apparatuses, and non-transitory computer-readable medium described herein may further include operations, features, means, or instructions for receiving a first message of a random access channel procedure based on a difference between a timing advance of the UE and the timing advance indicated by the second message satisfying a threshold.

Some examples of the method, apparatuses, and non-transitory computer-readable medium described herein may further include operations, features, means, or instructions for receiving a first message of a random access channel procedure based on the time period elapsing.

Some examples of the method, apparatuses, and non-transitory computer-readable medium described herein may further include operations, features, means, or instructions for failing to receive an uplink message via the uplink grant occasion or a handover resource based on an initial timing error for a timing advance not being within half of a cyclic prefix (CP) of a target cell.

Some examples of the method, apparatuses, and non-transitory computer-readable medium described herein may further include operations, features, means, or instructions for receiving one or more messages in accordance with a feedback type associated with the uplink grant occasion.

Some examples of the method, apparatuses, and non-transitory computer-readable medium described herein may further include operations, features, means, or instructions for receiving a first message of a random access channel procedure based on one or more parameters satisfying one or more thresholds, the one or more parameters including a timing advance, a location of the UE, a quantity of uplink grant occasions including the uplink grant occasion, a valid time window associated with the uplink grant occasion, or any combination thereof.

DETAILED DESCRIPTION

Figure 1:
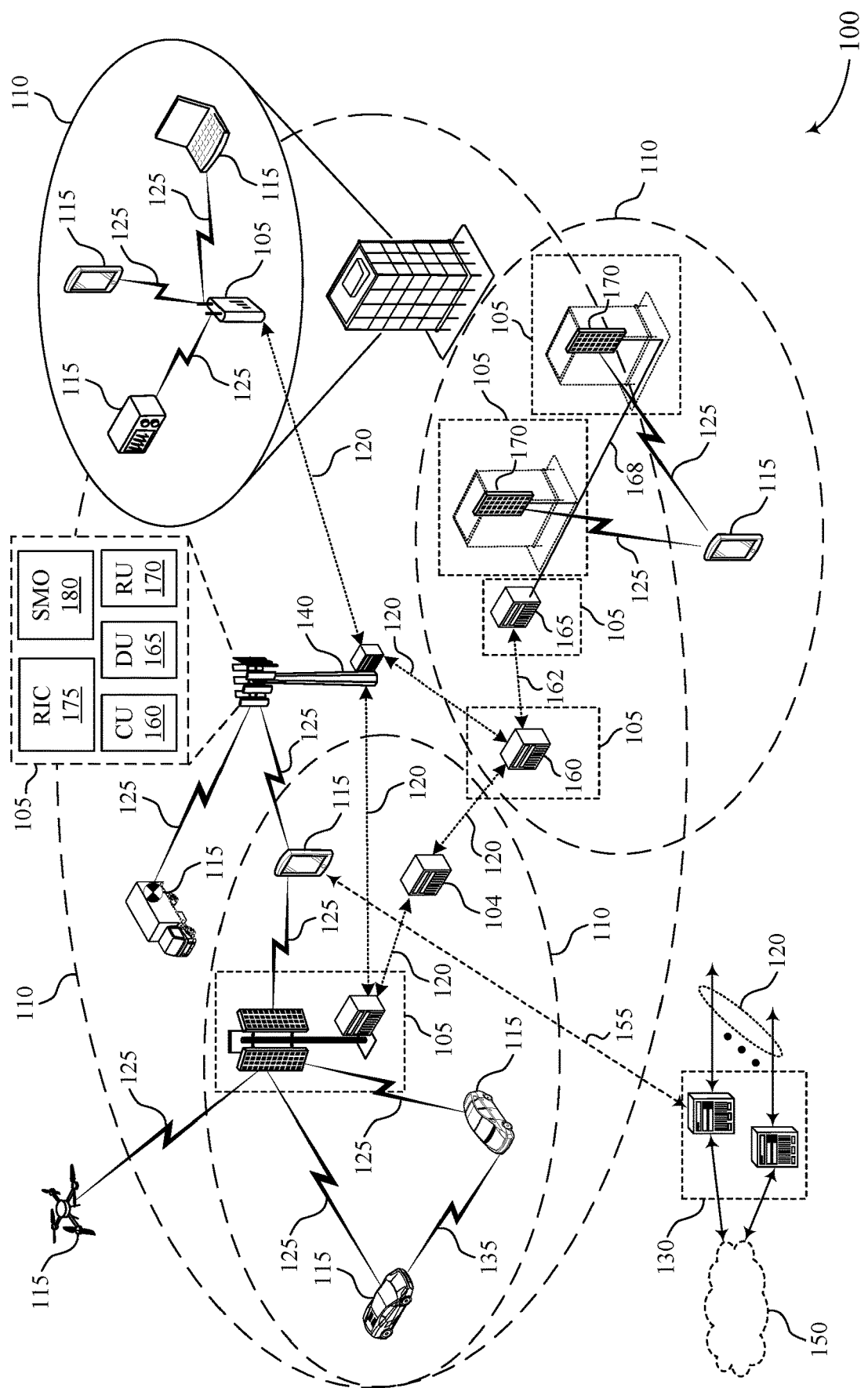
FIG. 1 illustrates an example of a wireless communications system that supports techniques for handover in non-terrestrial networks in accordance with one or more aspects of the present disclosure.

Some wireless communications systems may support non-terrestrial networks (NTNs). For example, a satellite may communicate with or forward communications between a user equipment (UE) and a network entity. Cell handover (CHO) of a UE from a source cell to a target cell may be based on time or location. The UE may communicate with a first cell (e.g., a source cell) and perform a random access channel (RACH) procedure to handover to a second cell (e.g., a target cell). However, such techniques may be relatively inefficient. For example, in the event of a gateway or satellite switch, a large quantity of UEs may be handed over from a source cell to the target cell. In such examples, the large quantity of UEs may be initiating random access procedures with the target cell at the same time or close to the same time (e.g., transmitting messages of a RACH procedure via the same or similar resources), which may result in congestion and relatively high signaling overhead in the system.

The techniques described herein may provide for RACH-less handover in wireless communications systems (e.g., NTNs), which may improve system efficiency. For example, wireless devices may communicate signaling that enables RACH-less handover from a source cell to a target cell. As an illustrative example, a network entity may request a UE to report information for a conditional handover (e.g., RACH-less handover). The UE may indicate the information (e.g., assistance information) in a report message. The information may include a differential delay (e.g., estimated propagation delay), a variation rate for the change of the service link delay, the differential delay in a future time window (e.g., the projected differential delay during the hand over period), the UE position, the satellite positions, and the like, which may enable cell handover for NTN. In some examples, the source cell may forward the assistance information to the target cell. By communicating such information, accurate parameters (e.g., timing advance (TA), offset, etc.) may be used for handover and subsequent communications between the UE and the target cell. Thus, the network may provide an uplink grant for the UE to transmit a handover complete message without performing a RACH procedure. Additionally, or alternatively, if one or more thresholds for the RACH-less procedure are not satisfied, the UE may initiate a RACH procedure with the target cell. In some examples, the UE may determine a feedback type for the pre-allocated uplink grant. In such examples, the UE may transmit one or more retransmissions of the uplink grant message, skip the uplink grant, or both based on the feedback type.

Aspects of the disclosure are initially described in the context of wireless communications systems. Aspects of the disclosure are then described in the context of a timeline and a process flow. Aspects of the disclosure are further illustrated by and described with reference to apparatus diagrams, system diagrams, and flowcharts that relate to techniques for handover in non-terrestrial networks.

FIG. 1 illustrates an example of a wireless communications system 100 that supports techniques for handover in non-terrestrial networks in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for handover in non-terrestrial networks as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, MC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

The wireless communications system 100 may support non-terrestrial network communications. For example, one or more network entities 105 may be examples of a satellite or another NTN device. In some examples, the wireless communications system 100 may support RACH-less handover between cells in the system. For example, a UE 115 may communicate with a source cell (e.g., a network entity 105, a component of a network entity 105), which may additionally or alternatively be referred to as a serving cell. The UE 115 may undergo a handover procedure to switch from the source cell to a target cell (e.g., another network entity 105, a component of the network entity 105). The UE 115 may communicate information, such as assistance information, with the network to enable a cell handover without RACH. For example, the UE 115 may exchange signaling indicating one or more parameters (e.g., timing advance, location information, and the like) and the UE 115 may use such parameters to communicate with the target cell. In such examples, the UE 115 may be provided with an uplink grant for communicating a handover complete message to the target cell using the parameters (e.g., without a RACH procedure with the target cell), which may result in improved system efficiency, among other benefits.

Figure 2:
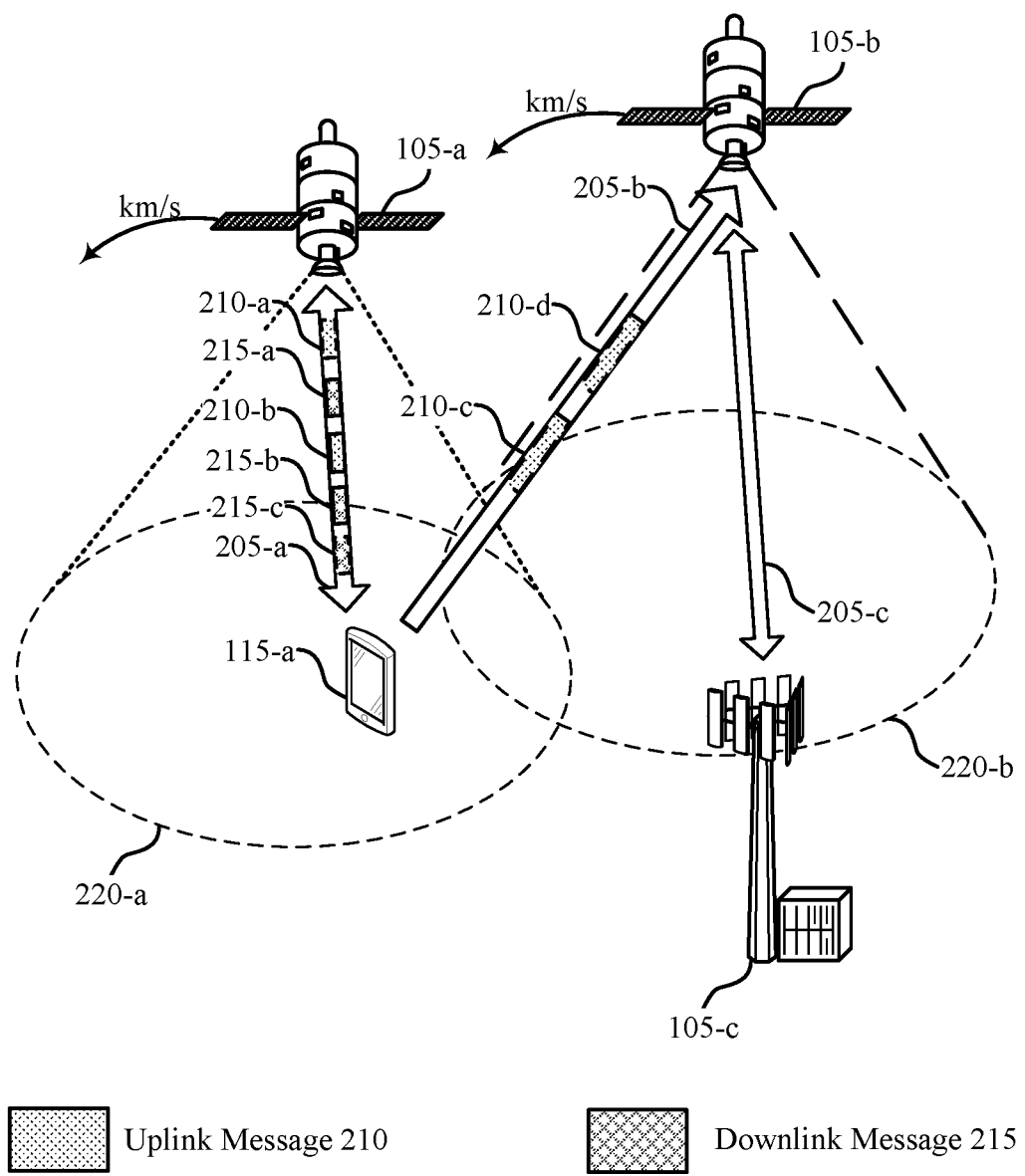
FIG. 2 illustrates an example of a wireless communications system that supports techniques for handover in non-terrestrial networks in accordance with one or more aspects of the present disclosure.

FIG. 2 illustrates an example of a wireless communications system 200 that supports techniques for handover in non-terrestrial networks in accordance with one or more aspects of the present disclosure. The wireless communications system 200 may support non-terrestrial networks (NTNs). The network entities 105-a, 105-b, and 105-c may be network entities (e.g., base stations, satellites, or other entities). For example, the network entity 105-a may communicate with or forward communications between a UE 115-a and the network entity 105-c, which may be examples of the corresponding devices described herein with reference to FIG. 1.

Generally, the wireless communications system 200 shows an example of network entity 105-a (e.g., a satellite of an NTN) serving the UE 115-a via a source cell 220-a and a network entity 105-b having a target cell 220-b for the UE 115-a to communicate with after handover, though it is to be understood that any quantity or type of devices or cells may be implemented in the wireless communications system 200. For example, a single satellite may include the source cell 220-a and the target cell 220-b, the network entity 105-c may be used in addition or alternative to the network entity 105-a or 105-b, and the like.

The source cell 220-a may be referred to as a serving cell 220-a for the UE 115-a. For example, the source cell 220-a may be a serving cell 220-a with which the UE 115-a has already established a communication link (e.g., via a previous RACH procedure or RACH-less handover). In some examples, although described with reference to cell handover, the techniques described herein may additionally or alternatively be applied to any handover event (e.g., hard handover, inter-frequency handover, intra-cell handover, inter-cell handover, intra-frequency handover, soft handover, and the like).

In some examples, the wireless communications system 200 may support time and location based hand over (e.g., for NTNs). For example, devices may perform one or more cell handover events based on whether one or more thresholds (e.g., conditions) are satisfied. As an illustrative example, a location-based handover (e.g., CondEvent D1) or a time-based handover (e.g., CondEvent T1) may be performed based on the one or more thresholds. A location-based handover (e.g., CondEvent D1) may have an entering condition that is satisfied when a first condition (e.g., condition D1-1) and a second condition (e.g., condition D1-2) are satisfied (e.g., greater than a threshold). For example, a device may perform the location-based handover if the first condition is satisfied and the second condition is satisfied. For instance, the first condition may be met when a difference between a UE reference location (Ml1) and a hysteresis parameter for the event (Hys) satisfying the threshold "Thresh 1" (e.g., Ml1-Hys being greater than Thresh1). The second condition may be met when a difference between a reference UE location (Ml2) and a hysteresis parameter for the event (Hys) satisfying the threshold "Thresh 2" (e.g., Ml1−Hys being less than, or greater than, or equal to, Thresh2). In some examples, the devices may "leave" a cell handover event (e.g., halt communications associated with the cell handover event) based on one or more thresholds (e.g., leaving conditions) being satisfied. For example, such leaving conditions may be satisfied when a third condition (e.g., condition D1-3) and a fourth condition (e.g., condition D1-4) are greater than a threshold (e.g., Ml1+Hys<Thresh1 and Ml2−Hys>Thresh2). In some examples, a threshold distance (e.g., a maximum distance for performing cell handover) may be defined (e.g., a value of 3000 km, 16 bits, or both).

In some examples, devices may perform one or more cell handover events as part of a time-based handover (e.g., CondEvent T1) based on the one or more thresholds. For example, a time-based handover may have an entering condition that is satisfied when a first condition (e.g., condition T1-1) is satisfied (e.g., greater than a threshold). Leaving conditions may be satisfied when a condition (e.g., condition T1-2) is satisfied (e.g., greater than a threshold). For example, a device may perform time-based handover when an entering condition is satisfied (e.g., Mt>Thresh1, where Mt is a reference time associated with the UE) and a leaving condition is satisfied. (e.g., Mt>Thresh1+duration). In some examples, a threshold time measurement (e.g., T2 timer indicating a maximum time) may be defined as an integer (e.g., INTEGER (1.6000)) including step values, where each step is a duration of time (e.g., 100 ms). In some examples, the time measurement may have a defined maximum value (e.g., 600 seconds).

In some examples, the wireless communications system 200 may support cell handover via a RACH procedure. For example, the UE 115-a may communicate with a source cell 220-a and perform a RACH procedure to handover UE 115-a to a target cell 220-b for subsequent communications. In some examples, the RACH procedure may be an example of a two-step RACH procedure. In a two-step RACH procedure, the UE 115-a may transmit a first message (e.g., msgA) and receive a second message (e.g., msgB) from the target cell 220-b. Based on exchanging the first and second messages of the RACH procedure, the UE 115-a may establish communications with the target cell 220-b and communicate in accordance with the messaging (e.g., the UE 115-a may use a timing advance, resources, an identifier (ID), or other examples of parameters for communications with the target cell 220-b that are obtained as part of the RACH procedure). Additionally, or alternatively, the RACH procedure may be an example of a four-step RACH procedure (e.g., the UE may transmit a msg1 and a msg3 and receive a msg2 and a msg4 to establish communications).

In some other examples, the wireless communications system 200 may support cell handover without RACH (e.g., RACH-less handover). For example, the serving cell 220-a and the target cell 220-b may be synchronized, and the network entity 105-a may send an uplink grant for the UE 115-a to send a message indicating the handover is complete (e.g., a handover complete message, for example, without transmitting RACH messages). In some such examples, the serving cell 220-a may forward information to the target cell 220-b to enable such handover (e.g., the serving cell 220-a may obtain parameters as described herein and forward such assistance information to the target cell 220-b, which may use the obtained parameters for communicating with the UE 115-a without obtaining the parameters from a RACH procedure).

If a UE 115-a receives an uplink grant and successfully completes the handover, then the UE 115-a may refrain from one or more of the steps of a RACH procedure (e.g., the UE 115-a may not communicate physical RACH (PRACH) Msg1 and a random access response (RAR) message (Msg3)). In some examples, the network (e.g., the network entities 105) may configure the UE 115-a with a parameter, such as a timing advance indicator (e.g., $N_{ta}$=0) indicating an index of a timing advance value for the UE 115-a to use for communications with the target cell 220-b. In some examples, the source cell 220-a may configure the UE 115-a to use the pre-allocated uplink grant. In some examples, the pre-allocated uplink grant is not provided, and the UE monitors a channel of the target cell 220-b (e.g., a physical downlink control channel (PDCCH)) to receive an uplink grant.

In some examples, RACH-less handover or handover without some RACH steps may improve communications efficiency and reduce signaling overhead. For example, in the event a gateway or satellite switch (e.g., a serving satellite may be moving such that one or more UEs are exiting a coverage area of the serving satellite and/or entering a coverage area of a satellite with the target cell 220-b), a large quantity of UEs 115-a may be handed over from a source cell 220-a to the target cell 220-b. In such examples, RACH-less conditional handover may improve system efficiency, for example, by reducing the quantity of messages communicated between the target cell 220-b and the quantity of UEs 115 at a same or similar time.

The wireless devices, such as the network entities 105 and the UE 115-a, may communicate signaling that enables RACH-less handover from a source cell 220-a to a target cell 220-b through communication link 205-a. The network entity 105-a may be an example of a satellite having a serving cell 220 (e.g., the source cell 220-a, though it is to be understood that any communications described as occurring between two components such as the source cell 220-a and the UE 115-a may additionally or alternatively be performed between two other components such as the target cell 220-b, the UE 115-a, the source cell 220-a, or any combination thereof).

For example, the network entity 105-a may transmit the downlink message 215-a to the UE 115-a. The downlink message 215-a may be an example of a request message including a request to the UE 115-a to report information for a conditional handover (e.g., RACH-less handover) using communication link 205-*a*. That is, the downlink message 215-*a* may indicate a request for the UE 115-*a* to report one or more parameters in an uplink message 210-*b* (e.g., a report message). For example, the uplink message 210-*b* may include (e.g., indicate) a differential delay or estimated propagation delay for one or both of the cells 220, to provide the differential delay for a future time window (e.g., a time window associated with performing the handover as described herein with reference to FIG. 3) for one or both of the cells 220 (e.g., the target cell 220-*b*), an expected change in position of the UE 115-*a* based on a current velocity, or a combination thereof, among other examples of parameters.

Thus, the uplink message 210-*b* may indicate the information (e.g., assistance information in a report message such as one or more parameters associated with the cell handover). In some examples, the information (e.g., parameters) indicated by the uplink message 210-*b* may include a differential delay (e.g., estimated propagation delay) for the target cell 220-*b*. Such delays may indicate a difference in timing between when a signal is transmitted to when the signal is received between the UE 115-*a* and the network entity 105-*b*, or a differential quantity (e.g., a difference between the propagation delay associated with the source cell 220-*a* and the propagation delay associated with the target cell 220-*b*). In some examples, a propagation delay may be determined based on a reference signal (e.g., an expected time to receive or transmit the signal compared to an actual time to receive or transmit the signal), among other techniques for determining such delays. Additionally, or alternatively, the information may include a variation rate for the change of the service link delay (e.g., a rate that the delay of a service link is changing for the target cell 220-*b* and/or the source cell 220-*a*). The variation rate may be an example of a rate at which the propagation delay is changing for a time period (e.g., the delay may be change from a first time delay to a second time delay in a unit amount of time, such as 10 milliseconds per second, though any rate or delay may be used). For example, the variation rate may be a result of the positions or velocities of the devices relative to each other. The variation rate may be used to estimate a propagation delay for signals occurring in a future time period (e.g., the window of time associated with handover). In some examples, the information may include the estimated or differential delay for a future time window (e.g., the device may calculate a projected delay, or differential delay relative to the source cell 220-*a*, during the hand over period including the uplink grant for sending the handover complete message), or a combination thereof. In some examples, one or more of the parameters described herein may correspond to a first time period (e.g., T1 to T2) associated with the future handover time (e.g., a period for performing an upcoming handover procedure, the parameters may correspond to a second time period occurring before the first time period (e.g., T0 to T1), such as a present time window, or any other time periods. For example, the information may include an estimated propagation delay for the first time period, the second time period, or both, among other examples of parameters.

The information may include the positional information, such as the UE 115-*a* position, the network entities 105 positions (e.g., satellite positions), the projected positions of any device (e.g., based on one or more velocities such as the current UE 115-*a* velocity), the velocities or acceleration of one or more devices, an estimated handover time, and the like.

In some examples, the UE 115-*a* may be configured to trigger the report of the information (e.g., trigger assistance information) for a handover procedure (e.g., a procedure different than cell handover) if the UE 115-*a* is at a cell edge, if the UE 115-*a* is mobile, if there is no stored cell handover configuration for a candidate cell (e.g., the target cell 220-*b*), or any combination thereof. Additionally, or alternatively, a condition may be configured such as if assistance information was not sent before or has changed from a last report message, the UE may trigger the handover procedure and indicate associated information.

In some examples, the devices may determine a cell handover time. As an illustrative example, a device may determine a future handover time based on one or more positions of the devices (e.g., locations, an ephemeris of the target cell 220-*b* and/or the source cell 220-*a*, velocities, and the like), beam information, or any combination thereof. In some examples, a network entity 105 may indicate ephemeris and beam information of the target cell 220-*b* (e.g., candidate cell) (e.g., in an RRC message, in a downlink message 215-*a*). Stated alternatively, the UE 115-*a* may be provided with the ephemeris and beam information of the candidate cell. In some examples, if the ephemeris and beam information is included in a system information block (SIB), a message (e.g., an RRC message) may indicate an index of the network entity 105-*b* (e.g., the satellite associated with the target cell 220-*b*). In such examples, the UE 115-*a* may identify which ephemeris and beam information of the SIB to use for determination of the handover time based on the index.

The network entity 105-*a* may transmit downlink message 215-*b* via communication link 205-*a*. The downlink message 215-*b* may be an example of a configuration message. For example, the downlink message 215-*b* may be an example of an RRC message or a SIB as described herein, among other examples of configuration messages.

In some examples, such as for an earth-fixed cell (e.g., a cell with boundaries that does not move or stays relatively static as a satellite passes by), the handover time may be aligned with the cell stop time (e.g., a time at which the serving cell for the UE 115-*a* stops covering the area that includes the UE 115-*a*). In some examples, the UE 115-*a* may report an estimated handover time in addition or alternative to the various information (e.g., assistance information). Based on such a handover time estimate, the network may provide a time-based cell hand over command to the UE 115-*a*. In some examples, such as for an earth-moving cell (e.g., a cell with boundaries that moves with the movement of a satellite), the UE 115-*a* may determine a future handover time based on the position, ephemeris, and beam information of the target cell 220-*b*.

In some examples, the downlink message 215-*b* may include a request for the UE 115-*a* to provide assistance information corresponding to a time (e.g., T1 to T2). In some examples, in the downlink message 215-*a* or 215-*b* or both, the network entity 105-*a* may request the UE 115-*a* to perform measurement of one or more synchronization system blocks (SSBs) of the target cell 220-*b*. In some examples, the network entity 105-*a* may transmit information for performing SSB measurement (e.g., assistance information). For example, such information may include a synchronization system block measurement timing configuration (SMTC), a measurement gap, a measurement time where the network entity 105-*a* may refrain from scheduling the UE 115-*a* with any communications, or any combination thereof.

In some examples, the UE 115-a may be configured to provide a latest report close to the potential handover time (e.g., the estimated handover time). For example, the UE 115-a may be configured to provide a latest report (e.g., a last report before handover occurs) using uplink resources indicated by the network (e.g., the network entity 105 may provide the UE 115-a with an uplink shared channel resource to send the updated report before the time window [T1, T2] where the handover is scheduled or estimated to occur). In some examples, the UE 115-a may indicate a handover time estimate in the uplink message 210-b, and the network entity 105-a may receive the uplink message 210-b and indicate a time-based handover command to the UE 115-a in downlink message 215-a, 215-b, or 215-c. In some examples, the network may provide a handover command to the UE 115-a with updated values for the target cell 220-b timing advance command, K_offset (e.g., a quantity of time, such as a quantity of slots, between a downlink control information message and the scheduled uplink grant occasion), an ephemeris of one or more satellites, and the like.

In some examples, the source cell 220-a may forward the uplink message 210-b to the target cell 220-b. For example, the source cell 220-a may forward assistance information (e.g., one or more parameters described herein, among other examples of such information) to the target cell 220-b (e.g., in a handover preparation message, an interface communication that is extended to include such information, and the like). By communicating such information, accurate parameters (e.g., timing advance, offset, etc.) may be used for handover and subsequent communications between the UE 115-a and the target cell 220-b, for example, without a RACH procedure to obtain some of the information at each device.

In some examples, based on the uplink message 210-b received by the network entity 105-a, the UE 115-a may be configured with a TA to be used for the target cell 220-b within a time window (e.g., from T1 to T2), for example, in a downlink message 215-c (e.g., a configuration message) transmitted in response to the uplink message 210-b. A TA may indicate the length of time for a signal to travel from a cell (e.g., the network entity 105-a or 105-b) to the UE 115-b or vice versa. In some examples, the TA may be considered invalid for use before T1 and after T2 (e.g., outside of the time period associated with the handover operation). In some such examples, the UE 115-a may initiate a RACH procedure based on the TA being invalid (e.g., based on being outside of the time period for the handover operations).

In some examples, if the UE 115-a's calculated TA changes by a threshold compared to the configured TA, the UE may determine that the TA is not valid, initiate RACH, or both. For example, the UE 115-a may compare a TA calculated during the time period (e.g., between T1 and T2) to a TA received in the downlink message 215-c (or another message). The UE 115-a may initiate RACH based on the comparison (e.g., if the difference satisfies the threshold). In some examples, such a threshold or any threshold may be pre-configured at the UE 115-a or configured via control signaling (e.g., RRC, MAC-CE, DCI, and the like). In some examples, the UE 115-a may use contention based four step RACH or contention based two-step RACH (e.g., for use when RACH-less is not possible, for example, due to an invalid TA or other thresholds being satisfied or not satisfied). The UE 115-a may or may not be configured with contention free PRACH resources, resources for RACH-less handover, or both. In some examples, a time based cell handover execution condition may be changed to TA-based cell hand over execution.

In some examples, the UE 115-a may indicate a capability to determine the initial timing error for TA is within half of a cyclic prefix (CP). If the UE 115-a indicates a capability to determine the initial timing error for TA is within half of the CP, the UE 115-a may be configured with one or more handover resources. For example, the one or more handover resources may be one or more resources allocated for RACH-less handover from the source cell 220-a to the target cell 220-b. In some examples, the UE 115-a may determine the initial timing error for TA is not within half of the CP, and may release the one or more handover resources. Subsequent to the release of the one or more handover resources, or one or more RACH-less resources, the UE 115-a may initiate a random access procedure with the target cell 220-b. The UE 115-a may determine if a global navigation satellite system (GNSS) is updated, and may detect SSBs of the target cell 220-b for synchronization just before or during the time window for cell hand over (e.g., T1 to T2).

In some examples, the network entity 105-a may indicate in the downlink message 215-c to the UE 115-a a K_offset parameter value for the target cell 220-b. For example, downlink message 215-c may provide a common delta (e.g., K_offset=old K_offset+delta). The common delta may be defined accordingly (e.g., the common delta may be defined as new N_TA,common−old N_TA,common). N_TA,common may represent an index corresponding to a value for the TA. In some examples, the downlink message 215-c may not include a K_offset for the UE 115-a, and may indicate a target cell 220-b specific K_offset. For the reoccurring pre-allocated uplink grants, the first uplink grant occasion may occur after a condition (e.g., after the slot n+RRC processing time+OFFSET, where n indicates the slot where RRC reconfiguration (HO message) is received from the source and OFFSET>=K_offset). In some examples, if the difference between the parameter value for K_offset and the value of the UE 115-a's specific TA is larger than a threshold, the UE 115-b may be configured to release the pre-allocated uplink grant and initiate RACH to the target cell 220-b.

The UE 115-a may transmit uplink message 210-c to the network entity 105-b via communication link 205-b. The uplink message 210-c may indicate the handover message for target cell 220-b. For example, the uplink message 210-c may be a handover complete message transmitted in accordance with the various parameters or information described herein. Because such information may be made available at both the UE 115-a and the target cell 220-b prior to or during handover, the uplink message 210-c may be transmitted without a RACH procedure.

In some other examples, the UE 115-a may initiate a RACH procedure prior to transmitting the uplink message 210-c. For example, the UE 115-a may transmit uplink message 210-d to the target cell 220-b via communication link 205-b. The uplink message 210-d may initiate a RACH procedure (e.g., the uplink message 210-d may be an example of a msg1 or a msgA). In some examples, initiating the RACH procedure may be based on one or more thresholds being satisfied. For example, the UE 115-a may initiate RACH based on a TA being invalid as described herein, among other examples of thresholds (e.g., a distance threshold, a time period threshold, and the like). As an illustrative example of such thresholds, when the target cell 220-b configures the UE 115-a with resources for RACH-less handover, the UE 115-a may be configured to use RACH under one or more conditions. In a first condition (e.g., threshold), the UE may initiate RACH based on a TA changing by a threshold compared to a cell specific K_offset. In some examples, this condition may have one or more variations (e.g., change in elevation angle, change in RTT, etc.). In a second condition, the UE 115-a may initiate RACH if the location of the UE 115-a changes by a threshold compared the last uplink transmission to the source cell 220-a (or last TA report). In a third condition, the UE 115-a may initiate RACH if the predefined number of preallocated uplink grant occasions is exceeded (e.g., based on HARQ type as described herein), after which the UE 115-a may be configured not to use the preallocated uplink grant and may initiate PRACH. In a fourth condition, the UE 115-a may initiate RACH if a validity time window that is defined for the UE 115-a to use pre-allocated uplink grant or to receive PDCCH for uplink grant from the target cell 220-b expires. In some examples, although described as initiating RACH based on one or more thresholds being satisfied, it is to be understood that the UE may initiate RACH based at least in part on the thresholds failing to be satisfied, that a satisfied or an unsatisfied threshold may be greater than or less than the threshold value, or a combination thereof.

In some examples, the devices may determine a feedback type (e.g., a HARQ type) for the uplink grant for transmitting the uplink message 210-c. In some examples, a quantity of configured uplink processes may be configured to determine the HARQ process. As an illustrative example, a device may use Equation 1 to determine the HARQ process identifier:

$$HARQ \text{ Process } ID = \left[\text{floor}\left(\frac{CURRENT_{TTI}}{ulSchedInterval}\right)\right] modulo \; numberOfConfULProcesses. \quad (1)$$

In Equation 1, HARQ Process ID may represent the HARQ identifier for the process, the $CURRENT_{TTI}$ may represent a current transmission time interval, ulSchedInterval may represent an interval associated with uplink scheduling, and the numberofConfULProcesses may represent the quantity of configured uplink processes for the HARQ operations.

In NTNs, a HARQ process identifier (ID) for the uplink grant may be pre-configured (e.g., with control signaling). In some examples, the quantity of allowed HARQ processes may be configured or or may not be configured. The UE 115-a may use the uplink grant for a same transport block size, in other words, an original transmission or a repeat transmission. Such a transport block size may include an RRC reconfiguration complete message, a buffer status reporting (BSR) message, a TA report, an RLC status report message, or any combination thereof. In some examples, the HARQ mode (A or B) may be configured or follow the same as a dynamic grant in the target cell 220-b.

In some examples, after the initial transmission of the uplink message 210-c, the UE 115-a may be configured whether to skip the uplink grant or continue repeating the transmission in subsequent occasions on the resources (e.g., regardless of a HARQ mode). In some other examples, if the HARQ type is type A, the UE 115-a may skip the grant while uplink HARQ RTT timer is running. Additionally, or alternatively, if the HARQ type is B, the UE 115-a may be configured to release the pre-allocated grant (e.g., refrain from transmitting retransmissions in subsequent occasions) after the first transmission. In such a case, retransmission may be scheduled dynamically by the target cell 220-b.

In some examples, the various messages and parameters described herein may include any quantity or type of messages. For example, information or parameters described as being indicated in a message may additionally or alternatively be indicated in a different message, a different message type, or both. More messages may be used to indicate the information or less messages may be used (e.g., one message may include information described as being in separate messages). Messages described as being between two devices may additionally or alternatively be implemented by different devices or in different directions (e.g., an uplink message may instead be an example of a downlink message, and vice versa).

Figure 3:
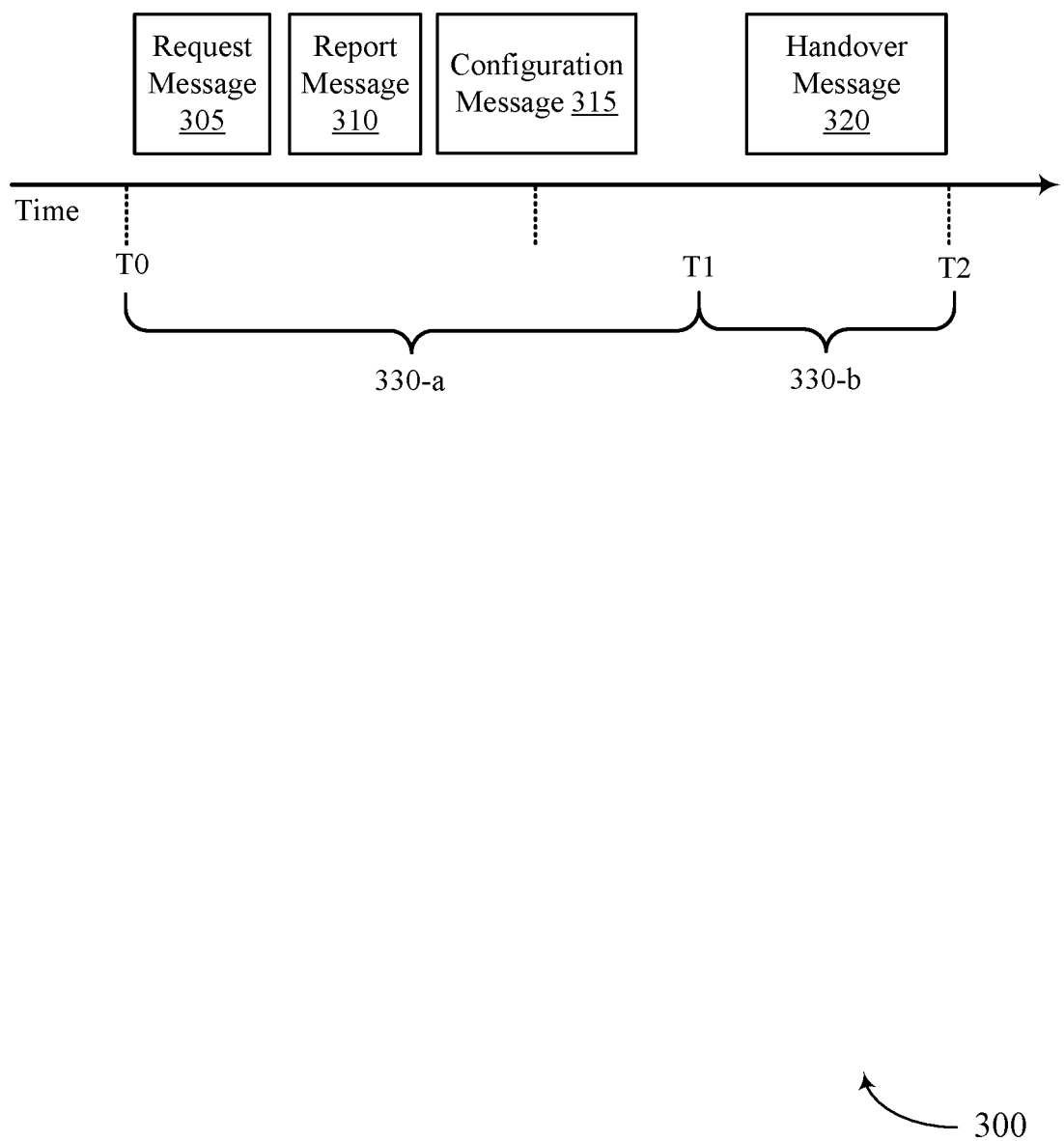
FIG. 3 illustrates an example of a timeline that supports techniques for handover in non-terrestrial networks in accordance with one or more aspects of the present disclosure.

FIG. 3 illustrates an example of a timeline 300 that supports techniques for handover in non-terrestrial networks in accordance with one or more aspects of the present disclosure. The timeline 300 may include examples of messages and time periods as described herein with reference to FIG. 2. Generally, the timeline 300 may illustrate an example of messaging that supports a RACH-less handover for a UE 115 from a source cell to a target cell as described herein.

The timeline 300 may include a time period 330-a and a time period 330-b. The time period 330-a may be a time window between T0 and T1 as described herein. For example, the time period 330-a may be an example of a time period occurring prior to a handover (e.g., a present or near to present time period). The time period 330-b may be an example of a subsequent time window between T1 and T2. The time period 330-b may be a time window associated with a future handover event as described in FIG. 2.

For example, the devices (the UE and network entity or entities) may identify an upcoming handover. The devices may determine the handover time as occurring between a start time at T1 and an end time of T2 (e.g., the handover may occur during at least a portion of the time period 330-b). In some examples, the source cell may transmit a request message 305. The request message 305 may be an example of a request message (e.g., a downlink message 215-a) as described herein. For example, the request message 305 may request the UE to report information associated with a cell handover procedure (e.g., assistance information).

The UE may transmit a report message 310 in response to the request message 305. The report message 310 may be an example of a report message as described herein (e.g., uplink message 210-a). For example, the report message may indicate information (e.g., one or more parameters), such as an estimated propagation delay during the time period 330-b, an estimated rate of change in the propagation delay during the time period 330-b, or other parameters (e.g., a delay or rate of change of the delay during the time period 330-a, location information, and the like as described with reference to FIG. 2).

The source cell may transmit a configuration message 315 to the UE in response to the report message 310. For example, the source cell may forward information to the target cell and configure the UE with a TA, an uplink grant occasion for transmitting a handover message 320, or other parameters as described with reference to FIG. 2.

In some examples, the UE may transmit the handover message 320 during the time period 330-b. For example, the UE may transmit a handover complete message indicating that the handover based on the communicated assistance information (e.g., parameters indicated in one or more messages) was successful. The handover message 320 may be transmitted in accordance with such information (e.g., using a configured or estimated TA via the scheduled resources for the uplink grant). In some other examples, the UE may release the resource for the handover message 320 and instead initiate a RACH procedure based on one or more thresholds being satisfied (or failing to be satisfied) as described herein with reference to FIG. 2.

Additionally, or alternatively, the timeline 300 may include additional or alternative messages, the messages described may be combined or omitted, the messages may be communicated in different link directions or between different devices, and the like.

Figure 4:
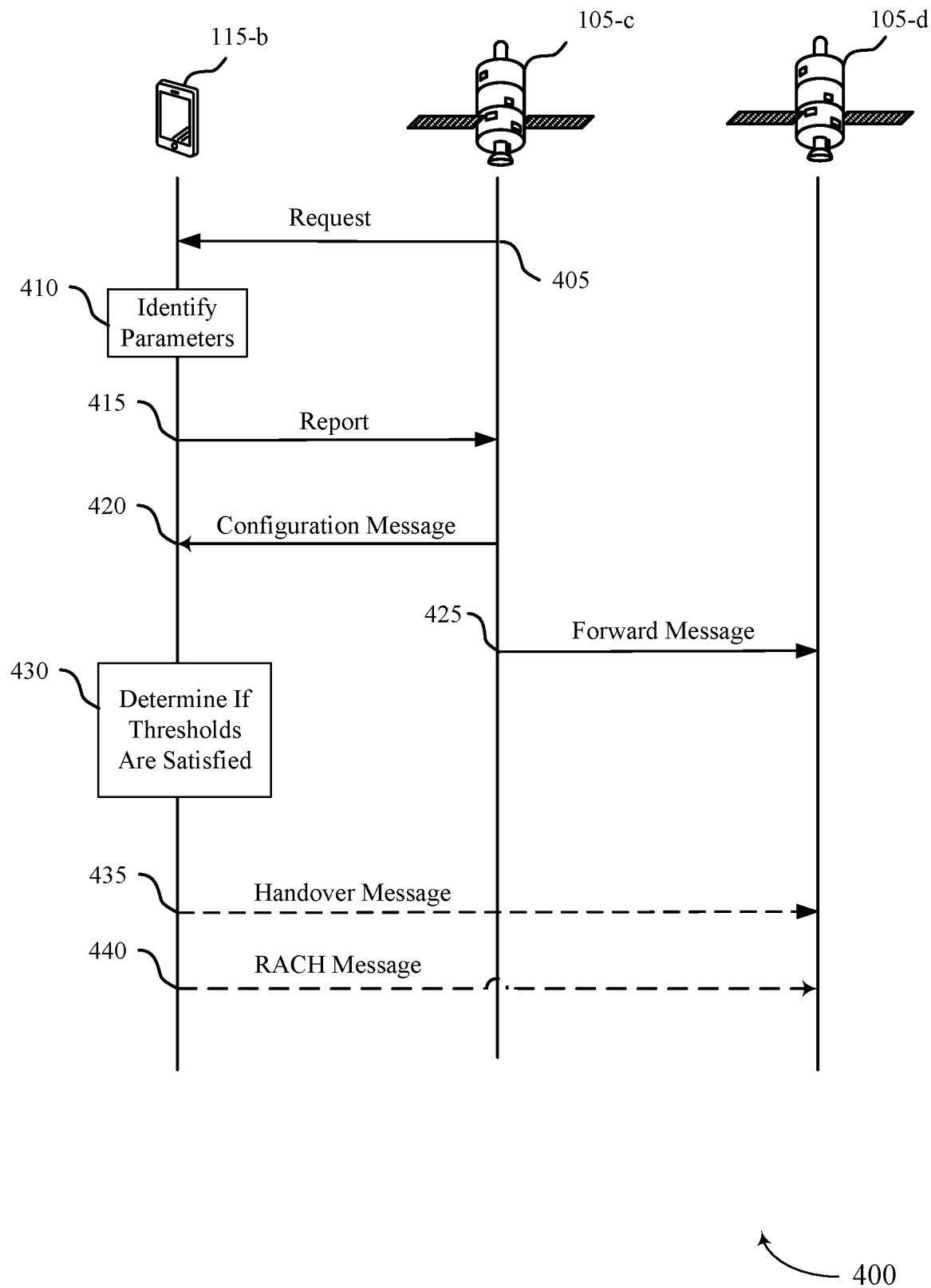
FIG. 4 illustrates an example of a process flow that supports techniques for handover in non-terrestrial networks in accordance with one or more aspects of the present disclosure.

FIG. 4 illustrates an example of a process flow 400 that supports techniques for handover in non-terrestrial networks in accordance with one or more aspects of the present disclosure. FIG. 4 illustrates communications between a UE 115-b, a network entity 105-c, and a network entity 105-d. The UE 115-b may be an example of the UE 115 in reference to FIG. 1 and the UE 115-a in reference to FIG. 2. The network entities 105 may be an example of the network entity 105 in reference to FIG. 1 and the network entities 105-a and 105-b in reference to FIG. 2. In some examples, the network entities 105 may be satellites. Although shown as separate satellites for illustrative clarity, it is to be understood that the source cell example of the network entity 105-c and the target cell example of the network entity 105-d may be a single satellite with multiple cells.

In the following description of the process flow 400, the operations between the UE 115-b and the network entities 105 may be transmitted in a different order than the order shown, or the operations performed by the UE 115-b and the network entities 105 may be performed in different orders or at different times. Some operations may also be left out of the process flow 400, or other operations may be added to the process flow 400. It is to be understood that while the UE 115-b and the network entities 105 are shown performing a number of the operations of process flow 400, any wireless device may perform the operations shown.

At 405, a request may be transmitted from the network entity 105-c to the UE 115-b. For example, the UE 115-b may receive a request from the network entity 105-c (e.g., a source cell) requesting the UE 115-b to report information for a conditional cell handover. In some examples, a conditional cell handover may be an example of a cell handover that is based at least in part on time, location, or both, among other examples of criteria for the handover. The information may include one or more parameters as described herein with reference to FIGS. 2 and 3, such as a differential delay or estimated propagation delay for the target cell for a future time window (e.g., T1 to T2), a variation rate for the delay, or both, among other examples of parameters.

At 410, the UE may identify one or more parameters requested by the network entity 105-c in the request message. At 415, the UE 115-b may transmit a report message as described herein. For example, the message may include an indication of parameters determined at 410. The message may include the information requested by the network entity 105-c and indicating a location of the UE, a change in position of the UE, a velocity of the UE, a position of the first cell (e.g., network entity 105-c), a position of the second cell (e.g., network entity 105-d), a cell handover time, one or more delays for one or more time periods, one or more variation rates for the delays, or any combination. The indication of parameters may be an example of the uplink message 210-b as described herein with reference to FIG. 2.

At 420, the network entity 105-c may transmit a configuration message to the UE 115-b. The configuration message may be an example of a message sent in response to the report 415 as described herein, among other examples of configuration messages. For example, the configuration message may indicate an uplink grant occasion for the cell handover message to the network entity 105-d, a timing advance, and the like. The configuration message at 420 may be an example of the downlink message 215-b as described herein with reference to FIG. 2.

At 425, the network entity 105-c may forward the indication of parameters received from UE 115-b at 415 to the network entity 105-d. By communicating such information, accurate parameters (e.g., timing advance, offset, etc.) may be used for handover and subsequent communications between the UE 115-a and the target cell.

At 430, the UE 115-b may determine if one or more thresholds are satisfied. For example, the UE 115-b may determine whether to complete the handover procedure with a handover message or initiate a RACH procedure with the network entity 105-d based on whether the thresholds are satisfied as described herein with reference to

FIG. 2.

In some examples, at 435, the UE 115-b may transmit a handover message to the target cell (e.g., the network entity 105-d), which may be an example of an uplink message 210-c to as described with reference to FIG. 2. For example, the UE 115-b may transmit the message to the target cell using the parameters and resources indicated by the configuration message 420 or determined by the UE 115-b.

In some examples, at 440, the UE 115-b may initiate a random access channel procedure with the network entity 105-d. For example, the UE 115-b may determine that one or more thresholds are satisfied (e.g., a TA is invalid, among other examples as described herein with reference to FIG. 2). The UE 115-b may transmit a first message of a RACH procedure based on the thresholds being satisfied or not being satisfied. The RACH message at 440 may be an example of the uplink message 210-d as described herein with reference to FIG. 2.

Figure 5:
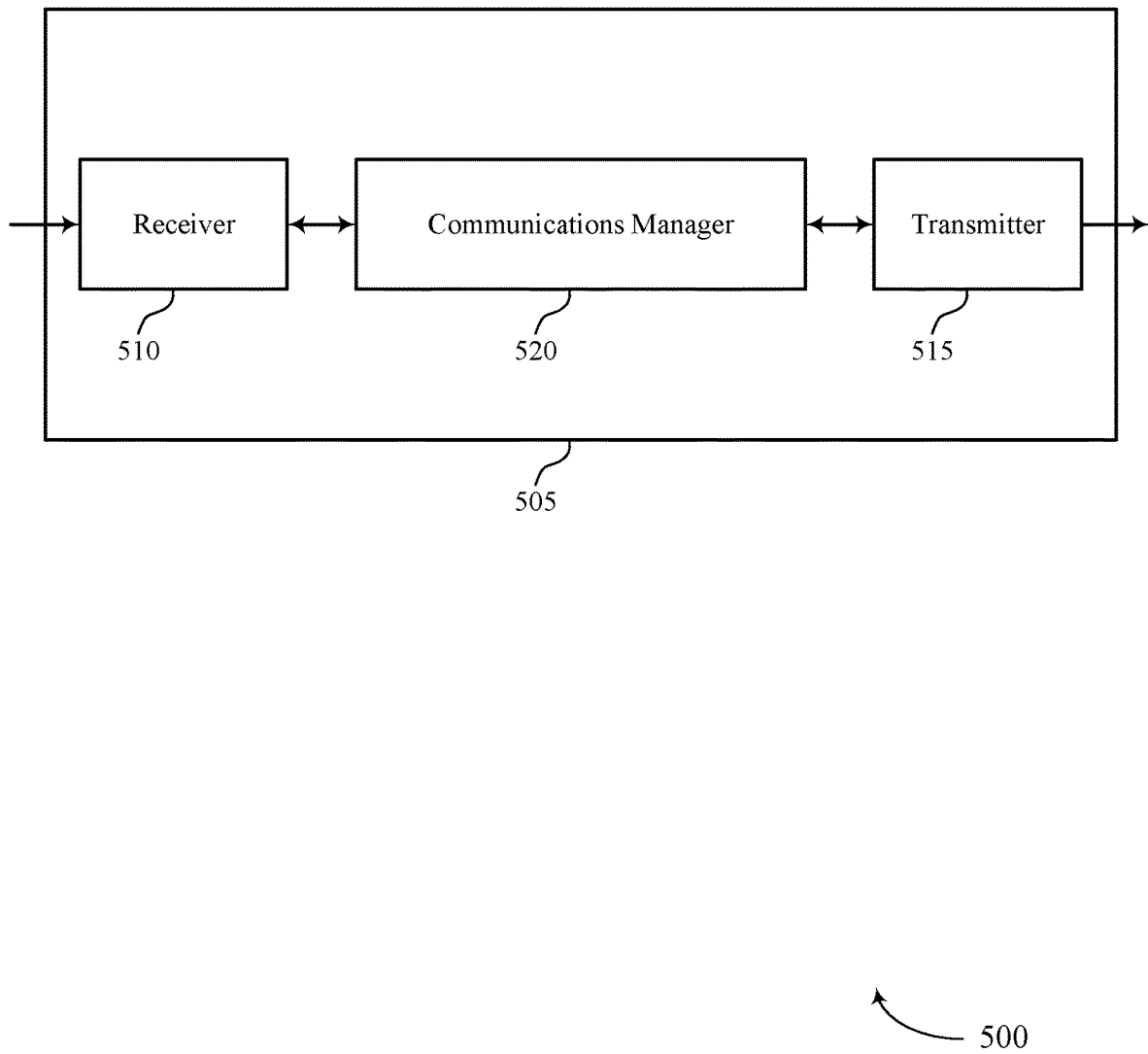
FIGS. 5 and 6 show block diagrams of devices that support techniques for handover in non-terrestrial networks in accordance with one or more aspects of the present disclosure.

FIG. 5 shows a block diagram 500 of a device 505 that supports techniques for handover in non-terrestrial networks in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for handover in non-terrestrial networks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for handover in non-terrestrial networks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for handover in non-terrestrial networks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both. The communications manager 520 may be configured as or otherwise support a means for transmitting, to the first cell, a message indicating the one or more parameters in response to receiving the request. The communications manager 520 may be configured as or otherwise support a means for receiving, from the first cell, an indication of an uplink grant occasion associated with the cell handover from the first cell to the second cell to be performed during the time period based on the one or more parameters.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for handover in NTNs. For example, the techniques may enable RACH-less handover, which may result in more efficient utilization of communication resources, improved system efficiency, reduced signaling congestion and overhead, reduced power consumption, or any combination thereof, among other advantages.

Figure 6:
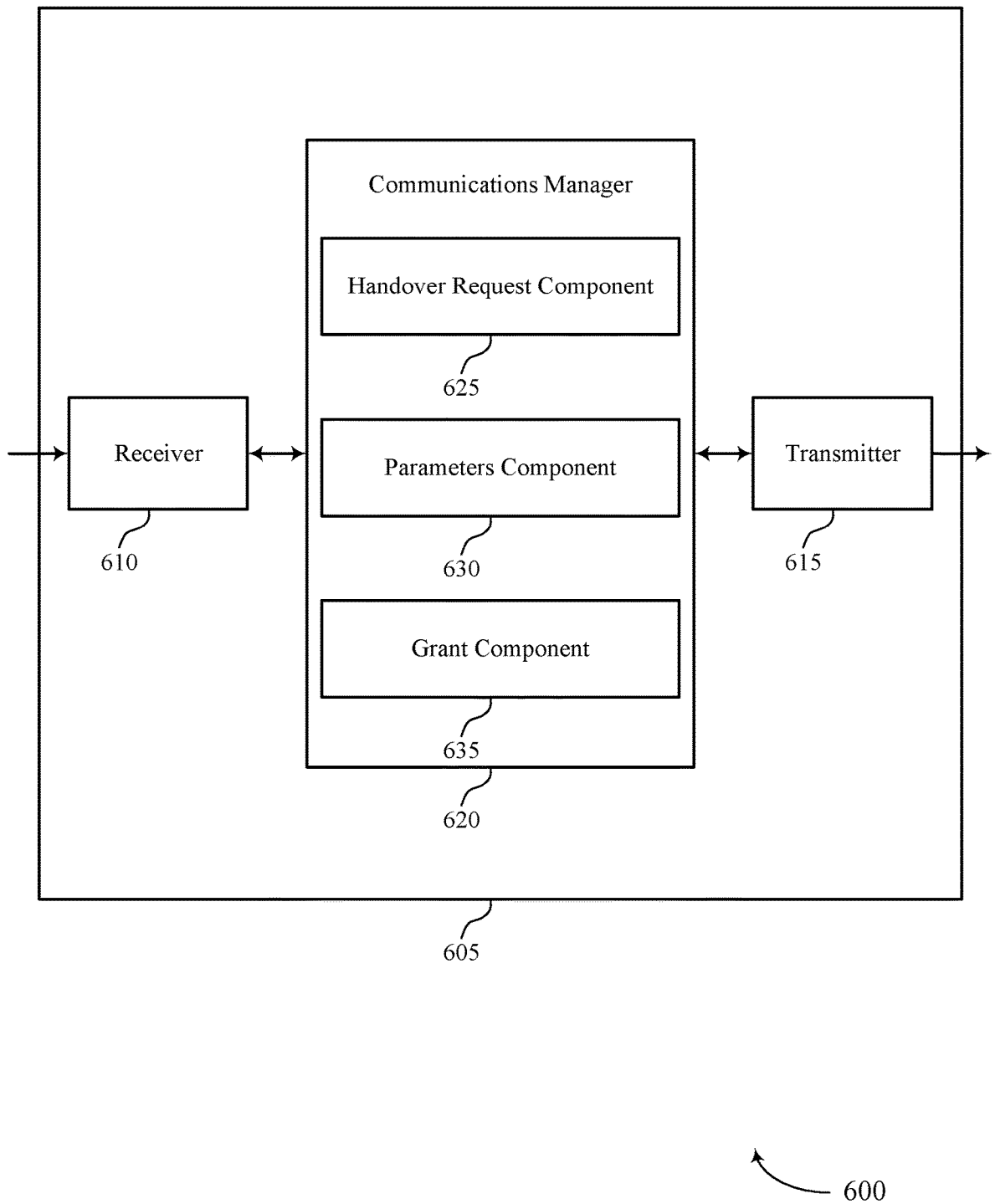

FIG. 6 shows a block diagram 600 of a device 605 that supports techniques for handover in non-terrestrial networks in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for handover in non-terrestrial networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for handover in non-terrestrial networks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for handover in non-terrestrial networks as described herein. For example, the communications manager 620 may include a handover request component 625, a parameters component 630, a grant component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The handover request component 625 may be configured as or otherwise support a means for receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both. The parameters component 630 may be configured as or otherwise support a means for transmitting, to the first cell, a message indicating the one or more parameters in response to receiving the request. The grant component 635 may be configured as or otherwise support a means for receiving, from the first cell, an indication of an uplink grant occasion associated with the cell handover from the first cell to the second cell to be performed during the time period based on the one or more parameters.

Figure 7:
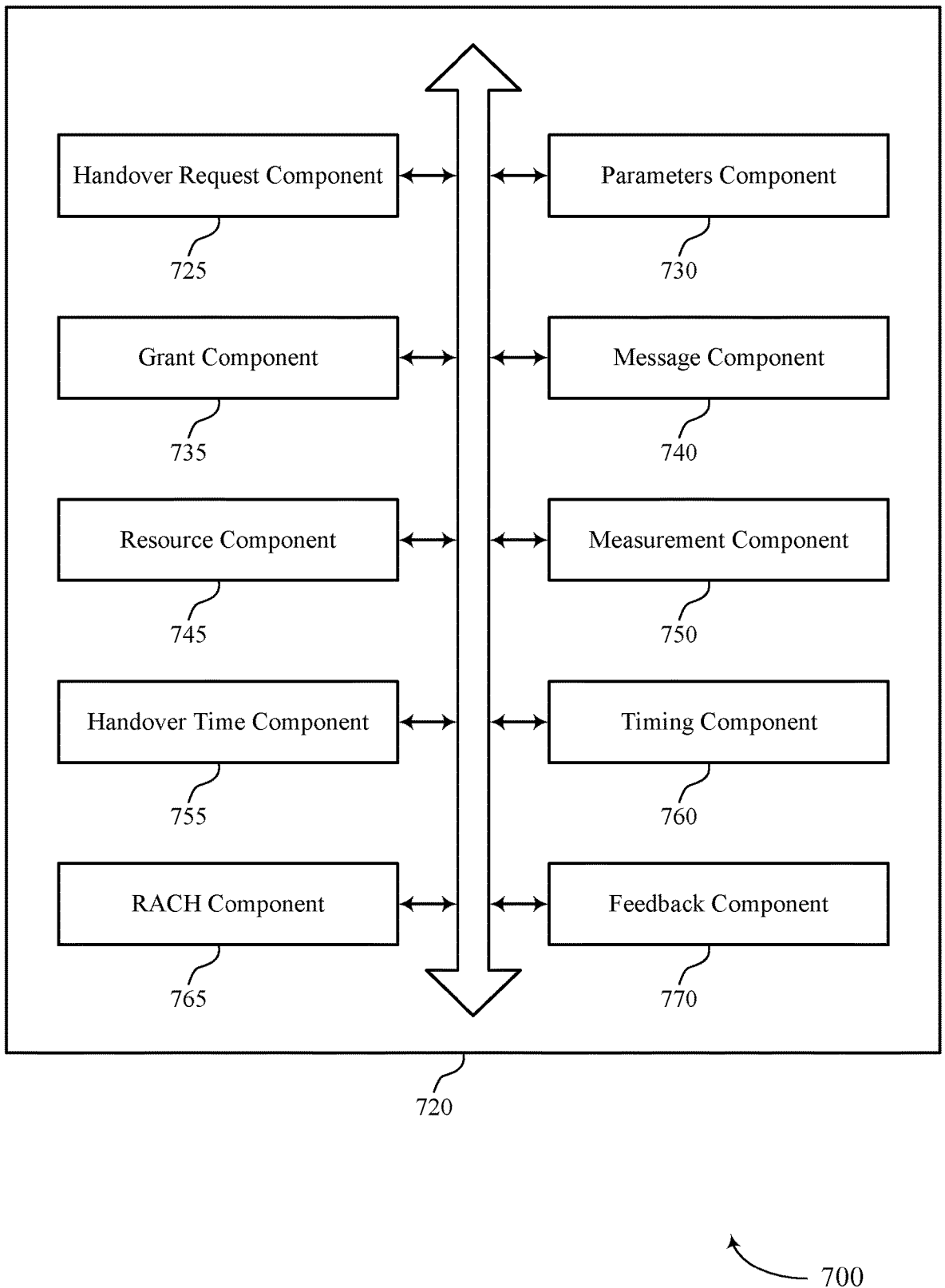
FIG. 7 shows a block diagram of a communications manager that supports techniques for handover in non-terrestrial networks in accordance with one or more aspects of the present disclosure.

FIG. 7 shows a block diagram 700 of a communications manager 720 that supports techniques for handover in non-terrestrial networks in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for handover in non-terrestrial networks as described herein. For example, the communications manager 720 may include a handover request component 725, a parameters component 730, a grant component 735, a message component 740, a resource component 745, a measurement component 750, a handover time component 755, a timing component 760, a RACH component 765, a feedback component 770, or any combination thereof. Each of these components may communicate, directly or indirectly, with one another (e.g., via one or more buses).

The communications manager 720 may support wireless communications at a UE in accordance with examples as disclosed herein. The handover request component 725 may be configured as or otherwise support a means for receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both. The parameters component 730 may be configured as or otherwise support a means for transmitting, to the first cell, a message indicating the one or more parameters in response to receiving the request. The grant component 735 may be configured as or otherwise support a means for receiving, from the first cell, an indication of an uplink grant occasion associated with the cell handover from the first cell to the second cell to be performed during the time period based on the one or more parameters.

In some examples, the parameters component 730 may be configured as or otherwise support a means for transmitting the message or a second message indicating an estimated propagation delay for a second time period, the second time period occurring prior to the time period.

In some examples, the parameters component 730 may be configured as or otherwise support a means for transmitting the message indicating the one or more parameters indicating a location of the UE, a change in position of the UE, a velocity of the UE, a position of the first cell, a position of the second cell, or any combination thereof.

In some examples, the message component 740 may be configured as or otherwise support a means for receiving a second message or the request indicating an ephemeris of the second cell, a timing advance associated with the second cell, a time offset associated with the second cell, or any combination thereof, where transmitting the message indicating the one or more parameters is based on receiving the second message.

In some examples, the resource component 745 may be configured as or otherwise support a means for receiving a second message indicating an uplink resource for sending a report to the first cell, the uplink resource occurring prior to the time period.

In some examples, the measurement component 750 may be configured as or otherwise support a means for receiving a second request to perform a measurement of a synchronization signal block of the second cell.

In some examples, the measurement component 750 may be configured as or otherwise support a means for receiving a second message indicating one or more measurement parameters, the one or more measurement parameters indicating a synchronization signal block measurement timing configuration, a measurement gap, a measurement time, or a combination thereof. In some examples, the measurement component 750 may be configured as or otherwise support a means for performing the measurement of the synchronization signal block in accordance with the one or more measurement parameters.

In some examples, the handover time component 755 may be configured as or otherwise support a means for determining a handover time associated with the cell handover based on the first cell being one of an earth fixed cell or an earth moving cell.

In some examples, the timing component 760 may be configured as or otherwise support a means for receiving a second message indicating a timing advance for the second cell during the time period.

In some examples, the timing component 760 may be configured as or otherwise support a means for determining that a difference between a calculated timing advance and the timing advance indicated by the second message satisfies a threshold. In some examples, the RACH component 765 may be configured as or otherwise support a means for transmitting, to the second cell, a first message of a random access channel procedure based on the satisfied threshold.

In some examples, the RACH component 765 may be configured as or otherwise support a means for transmitting, to the second cell, a first message of a random access channel procedure based on the time period elapsing.

In some examples, the timing component 760 may be configured as or otherwise support a means for determining whether the initial timing error for timing advance is within half of a cyclic prefix (CP) for the target cell. In some examples, the grant component 735 may be configured as or otherwise support a means for releasing the uplink grant occasion or a handover resource based on determining the initial timing error is not within half of the CP for the target cell.

In some examples, the feedback component 770 may be configured as or otherwise support a means for transmitting one or more messages in accordance with a feedback type associated with the uplink grant occasion.

In some examples, the parameters component 730 may be configured as or otherwise support a means for determining that one or more parameters satisfy one or more thresholds, the one or more parameters including a timing advance, a location of the UE, a quantity of uplink grant occasions including the uplink grant occasion, a valid time window associated with the uplink grant occasion, or any combination thereof. In some examples, the RACH component 765 may be configured as or otherwise support a means for transmitting a first message of a random access channel procedure based on the satisfied one or more thresholds.

Figure 8:
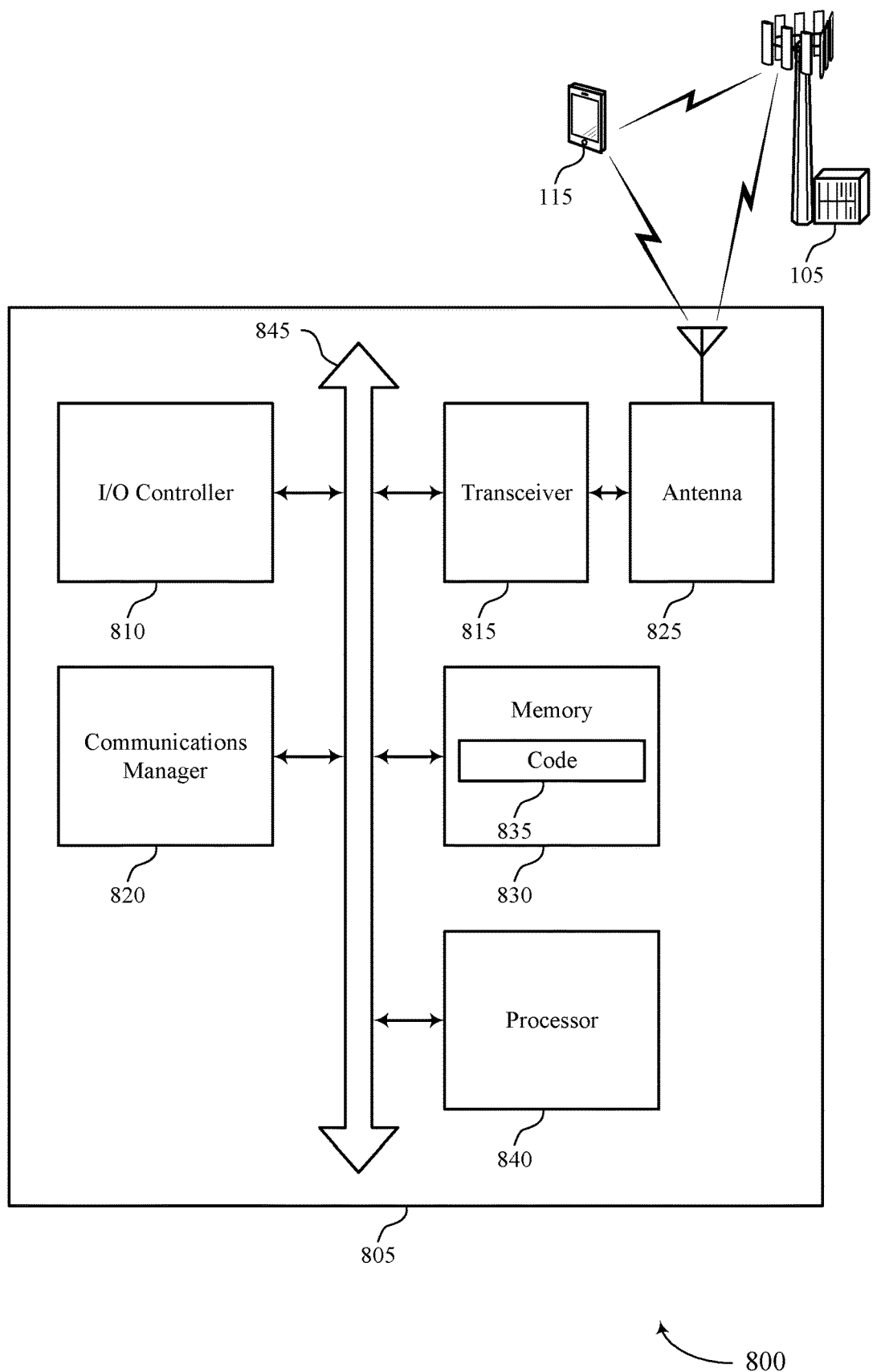
FIG. 8 shows a diagram of a system including a device that supports techniques for handover in non-terrestrial networks in accordance with one or more aspects of the present disclosure.

FIG. 8 shows a diagram of a system 800 including a device 805 that supports techniques for handover in non-terrestrial networks in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for handover in non-terrestrial networks). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both. The communications manager 820 may be configured as or otherwise support a means for transmitting, to the first cell, a message indicating the one or more parameters in response to receiving the request. The communications manager 820 may be configured as or otherwise support a means for receiving, from the first cell, an indication of an uplink grant occasion associated with the cell handover from the first cell to the second cell to be performed during the time period based on the one or more parameters.

By including or configuring the communications manager 820 in accordance with examples as described herein, the device 805 may support techniques for handover in NTNs. For example, the techniques may enable RACH-less handover, which may result in more efficient utilization of communication resources, improved system efficiency, reduced signaling congestion and overhead, reduced power consumption, or any combination thereof, among other advantages.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for handover in non-terrestrial networks as described herein, or the processor 840 and the memory 830 may be otherwise configured to perform or support such operations.

Figure 9:
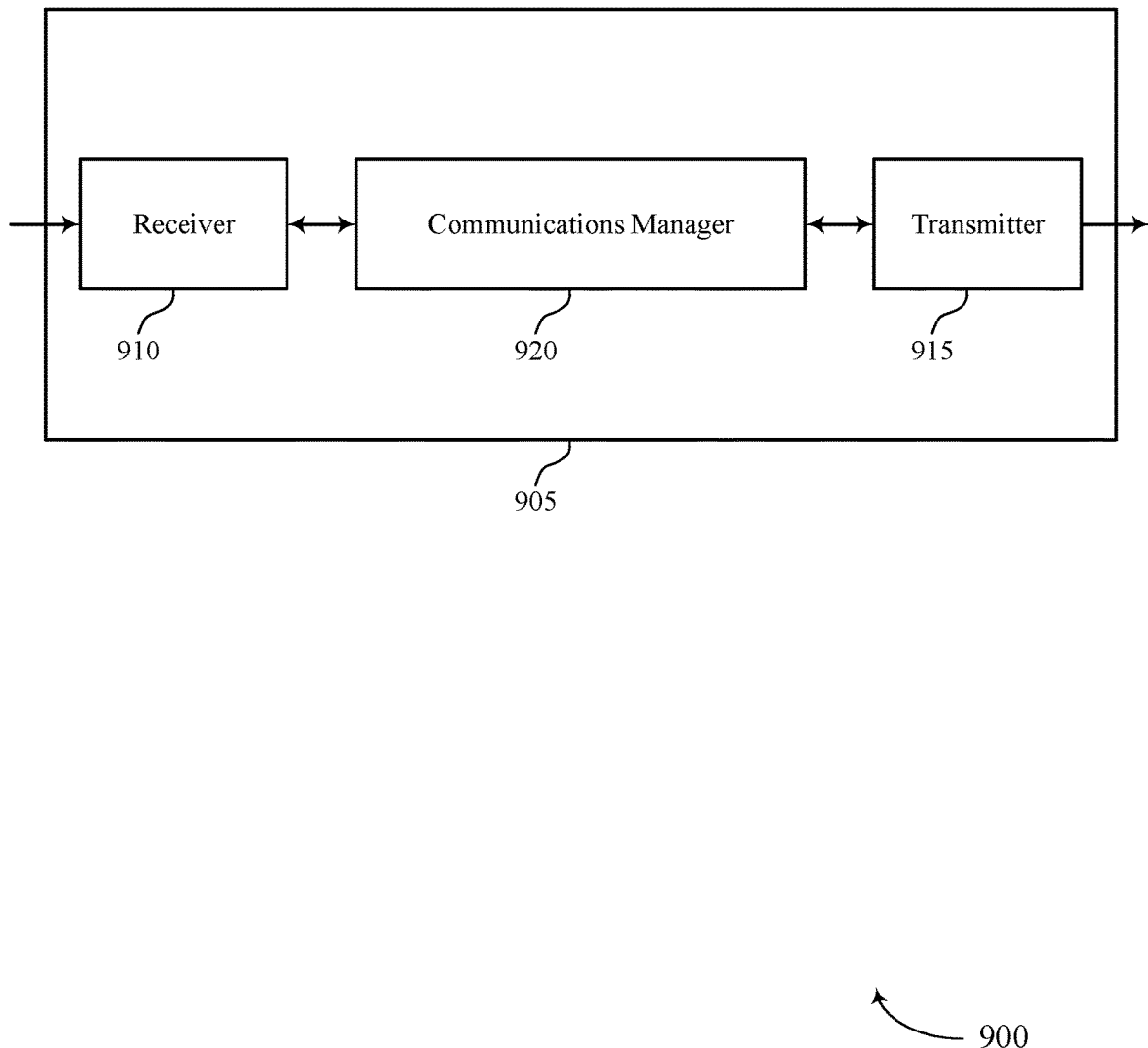
FIGS. 9 and 10 show block diagrams of devices that support techniques for handover in non-terrestrial networks in accordance with one or more aspects of the present disclosure.

FIG. 9 shows a block diagram 900 of a device 905 that supports techniques for handover in non-terrestrial networks in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of techniques for handover in non-terrestrial networks as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity associated with a first cell in accordance with examples as disclosed herein. For example, the communications manager 920 may be configured as or otherwise support a means for transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both. The communications manager 920 may be configured as or otherwise support a means for receiving a message indicating the one or more parameters in response to the transmitted request. The communications manager 920 may be configured as or otherwise support a means for transmitting an indication of an uplink grant occasion associated with the cell handover from the first cell to the second cell to be performed during the time period based on the one or more parameters.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for handover in NTNs. For example, the techniques may enable RACH-less handover, which may result in more efficient utilization of communication resources, improved system efficiency, reduced signaling congestion and overhead, reduced power consumption, or any combination thereof, among other advantages.

Figure 10:
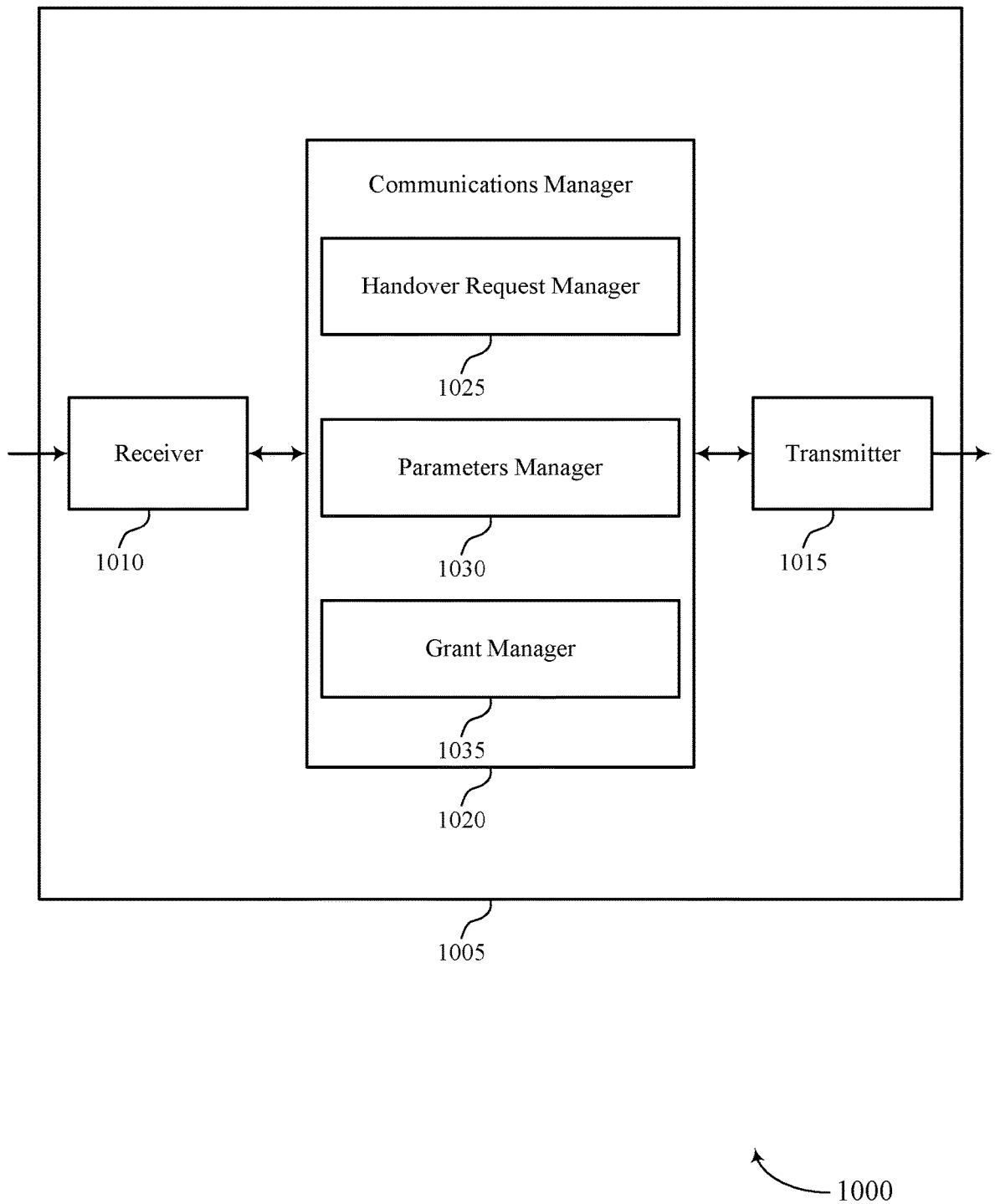

FIG. 10 shows a block diagram 1000 of a device 1005 that supports techniques for handover in non-terrestrial networks in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of techniques for handover in non-terrestrial networks as described herein. For example, the communications manager 1020 may include a handover request manager 1025, a parameters manager 1030, a grant manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity associated with a first cell in accordance with examples as disclosed herein. The handover request manager 1025 may be configured as or otherwise support a means for transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both. The parameters manager 1030 may be configured as or otherwise support a means for receiving a message indicating the one or more parameters in response to the transmitted request. The grant manager 1035 may be configured as or otherwise support a means for transmitting an indication of an uplink grant occasion associated with the cell handover from the first cell to the second cell to be performed during the time period based on the one or more parameters.

Figure 11:
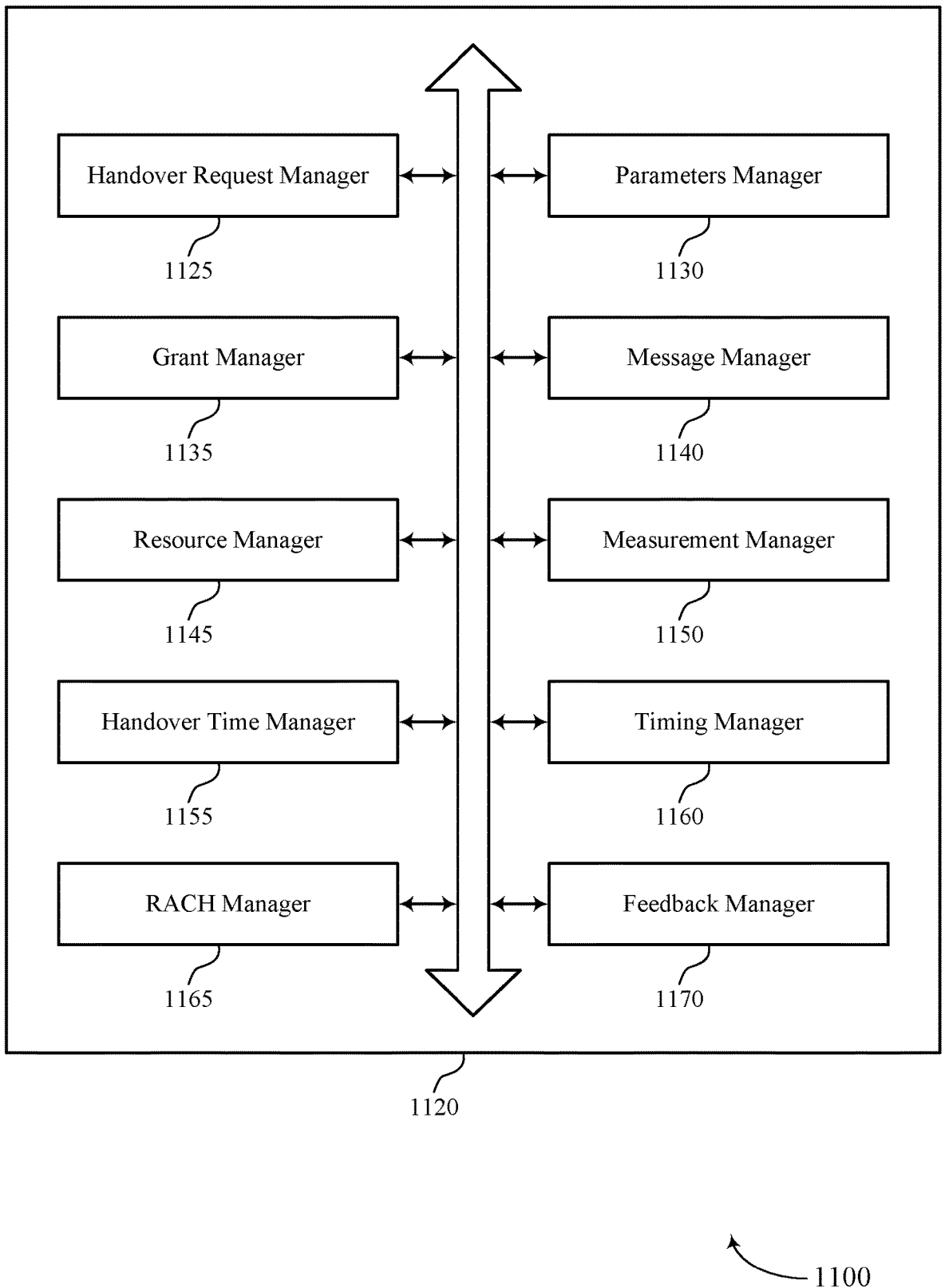
FIG. 11 shows a block diagram of a communications manager that supports techniques for handover in non-terrestrial networks in accordance with one or more aspects of the present disclosure.

FIG. 11 shows a block diagram 1100 of a communications manager 1120 that supports techniques for handover in non-terrestrial networks in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for handover in non-terrestrial networks as described herein. For example, the communications manager 1120 may include a handover request manager 1125, a parameters manager 1130, a grant manager 1135, a message manager 1140, a resource manager 1145, a measurement manager 1150, a handover time manager 1155, a timing manager 1160, a RACH manager 1165, a feedback manager 1170, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity associated with a first cell in accordance with examples as disclosed herein. The handover request manager 1125 may be configured as or otherwise support a means for transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both. The parameters manager 1130 may be configured as or otherwise support a means for receiving a message indicating the one or more parameters in response to the transmitted request. The grant manager 1135 may be configured as or otherwise support a means for transmitting an indication of an uplink grant occasion associated with the cell handover from the first cell to the second cell to be performed during the time period based on the one or more parameters.

In some examples, the parameters manager 1130 may be configured as or otherwise support a means for receiving the message or a second message indicating an estimated propagation delay for a second time period, the second time period occurring prior to the time period.

In some examples, the parameters manager 1130 may be configured as or otherwise support a means for receiving the message indicating the one or more parameters indicating a location of the UE, a change in position of the UE, a velocity of the UE, a position of the first cell, a position of the second cell, or any combination thereof.

In some examples, the message manager 1140 may be configured as or otherwise support a means for transmitting a second message or the request indicating an ephemeris of the second cell, a timing advance associated with the second cell, a time offset associated with the second cell, or any combination thereof, where transmitting the message indicating the one or more parameters is based on receiving the second message.

In some examples, the resource manager 1145 may be configured as or otherwise support a means for transmitting a second message indicating an uplink resource for sending a report to the first cell, the uplink resource occurring prior to the time period.

In some examples, the measurement manager 1150 may be configured as or otherwise support a means for transmitting a second request to perform a measurement of a synchronization signal block of the second cell.

In some examples, the measurement manager 1150 may be configured as or otherwise support a means for transmitting a second message indicating one or more measurement parameters, the one or more measurement parameters indicating a synchronization signal block measurement timing configuration, a measurement gap, a measurement time, or a combination thereof.

In some examples, the handover time manager 1155 may be configured as or otherwise support a means for determining a handover time associated with the cell handover based on the first cell being one of an earth fixed cell or an earth moving cell.

In some examples, the timing manager 1160 may be configured as or otherwise support a means for transmitting a second message indicating a timing advance for the second cell during the time period.

In some examples, the RACH manager 1165 may be configured as or otherwise support a means for receiving a first message of a random access channel procedure based on a difference between a timing advance of the UE and the timing advance indicated by the second message satisfying a threshold.

In some examples, the RACH manager 1165 may be configured as or otherwise support a means for receiving a first message of a random access channel procedure based on the time period elapsing.

In some examples, the message manager 1140 may be configured as or otherwise support a means for failing to receive an uplink message via the uplink grant occasion or a handover resource based at least in part on the initial timing error for a timing advance not being within half of the cyclic prefix (CP) of a target cell.

In some examples, the feedback manager 1170 may be configured as or otherwise support a means for receiving one or more messages in accordance with a feedback type associated with the uplink grant occasion.

In some examples, the RACH manager 1165 may be configured as or otherwise support a means for receiving a first message of a random access channel procedure based on one or more parameters satisfying one or more thresholds, the one or more parameters including a timing advance, a location of the UE, a quantity of uplink grant occasions including the uplink grant occasion, a valid time window associated with the uplink grant occasion, or any combination thereof.

Figure 12:
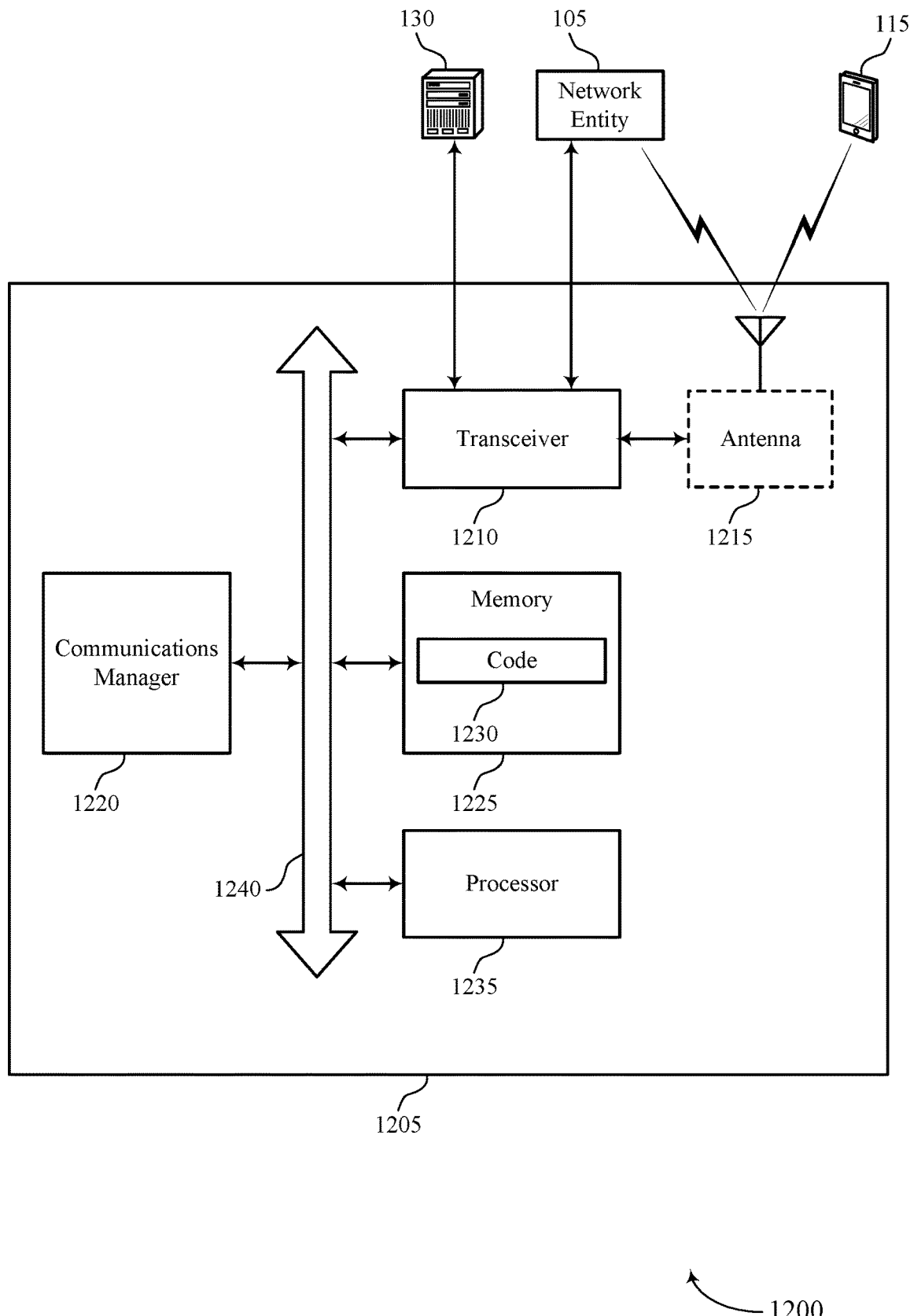
FIG. 12 shows a diagram of a system including a device that supports techniques for handover in non-terrestrial networks in accordance with one or more aspects of the present disclosure.

FIG. 12 shows a diagram of a system 1200 including a device 1205 that supports techniques for handover in non-terrestrial networks in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting techniques for handover in non-terrestrial networks). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity associated with a first cell in accordance with examples as disclosed herein. For example, the communications manager 1220 may be configured as or otherwise support a means for transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both. The communications manager 1220 may be configured as or otherwise support a means for receiving a message indicating the one or more parameters in response to the transmitted request. The communications manager 1220 may be configured as or otherwise support a means for transmitting an indication of an uplink grant occasion associated with the cell handover from the first cell to the second cell to be performed during the time period based on the one or more parameters.

By including or configuring the communications manager 1220 in accordance with examples as described herein, the device 1205 may support techniques support techniques for handover in NTNs. For example, the techniques may enable RACH-less handover, which may result in more efficient utilization of communication resources, improved system efficiency, reduced signaling congestion and overhead, reduced power consumption, or any combination thereof, among other advantages.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of techniques for handover in non-terrestrial networks as described herein, or the processor 1235 and the memory 1225 may be otherwise configured to perform or support such operations.

Figure 13:
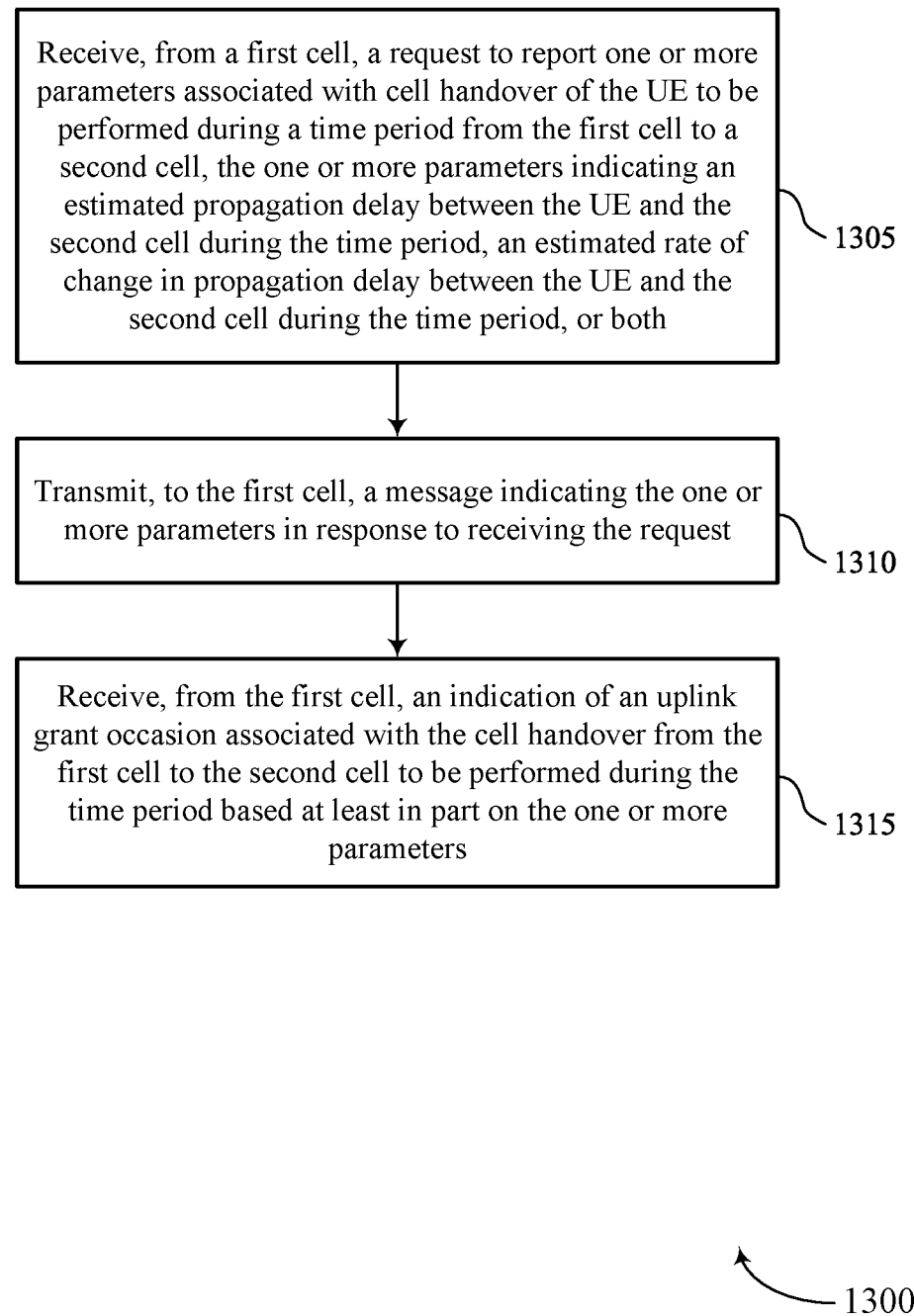
FIGS. 13 through 16 show flowcharts illustrating methods that support techniques for handover in non-terrestrial networks in accordance with one or more aspects of the present disclosure.

FIG. 13 shows a flowchart illustrating a method 1300 that supports techniques for handover in non-terrestrial networks in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both. The operations of 1305 may be performed in accordance with examples as disclosed herein. In some examples, aspects of the operations of 1305 may be performed by a handover request component 725 as described with reference to FIG. 7.

At 1310, the method may include transmitting, to the first cell, a message indicating the one or more parameters in response to receiving the request. The operations of 1310 may be performed in accordance with examples as disclosed herein. In some examples, aspects of the operations of 1310 may be performed by a parameters component 730 as described with reference to FIG. 7.

At 1315, the method may include receiving, from the first cell, an indication of an uplink grant occasion associated with the cell handover from the first cell to the second cell to be performed during the time period based on the one or more parameters. The operations of 1315 may be performed in accordance with examples as disclosed herein. In some examples, aspects of the operations of 1315 may be performed by a grant component 735 as described with reference to FIG. 7.

Figure 14:
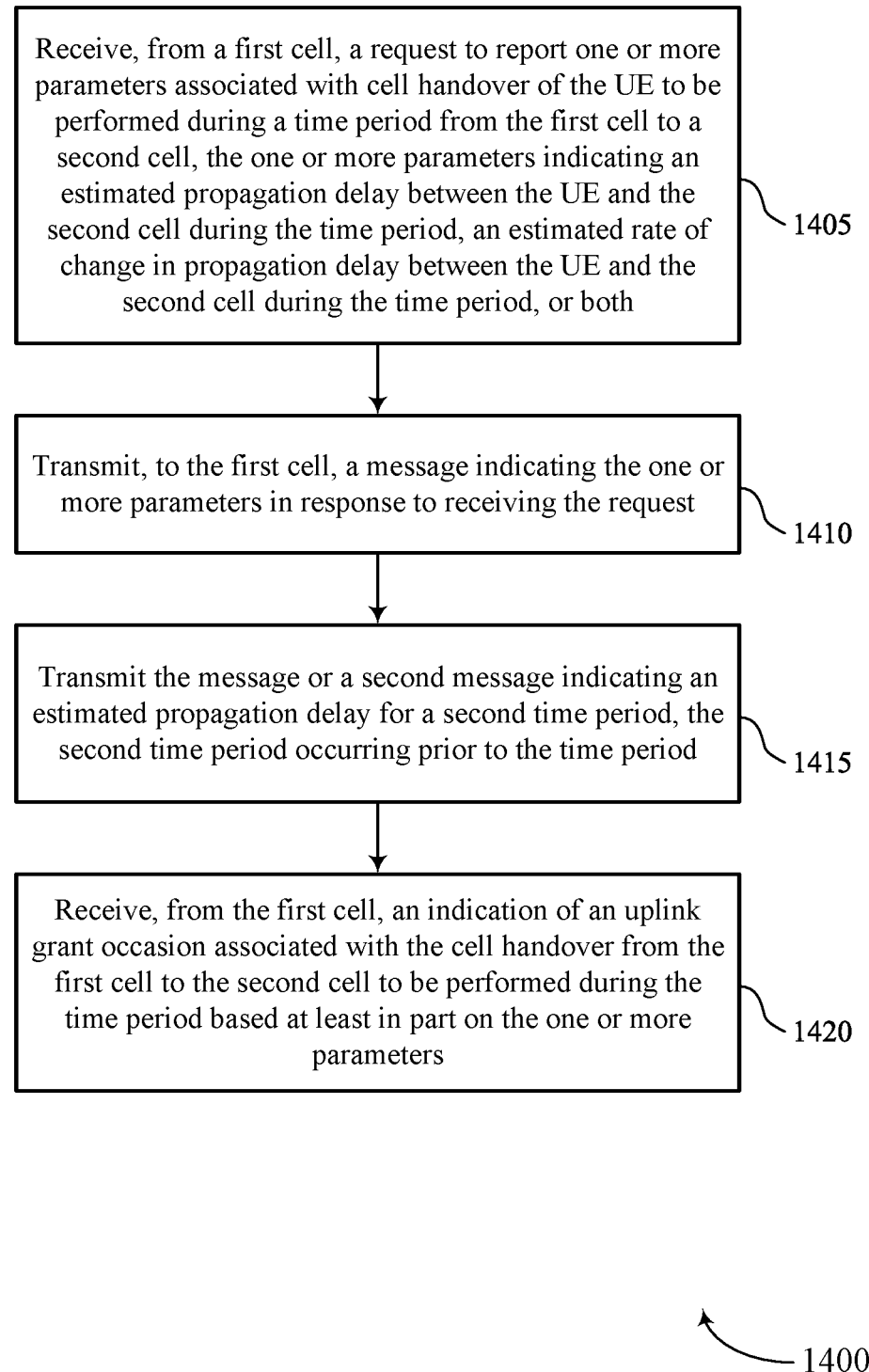

FIG. 14 shows a flowchart illustrating a method 1400 that supports techniques for handover in non-terrestrial networks in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both. The operations of 1405 may be performed in accordance with examples as disclosed herein. In some examples, aspects of the operations of 1405 may be performed by a handover request component 725 as described with reference to FIG. 7.

At 1410, the method may include transmitting, to the first cell, a message indicating the one or more parameters in response to receiving the request. The operations of 1410 may be performed in accordance with examples as disclosed herein. In some examples, aspects of the operations of 1410 may be performed by a parameters component 730 as described with reference to FIG. 7.

At 1415, the method may include transmitting the message or a second message indicating an estimated propagation delay for a second time period, the second time period occurring prior to the time period. The operations of 1415 may be performed in accordance with examples as disclosed herein. In some examples, aspects of the operations of 1415 may be performed by a parameters component 730 as described with reference to FIG. 7.

At 1420, the method may include receiving, from the first cell, an indication of an uplink grant occasion associated with the cell handover from the first cell to the second cell to be performed during the time period based on the one or more parameters. The operations of 1420 may be performed in accordance with examples as disclosed herein. In some examples, aspects of the operations of 1420 may be performed by a grant component 735 as described with reference to FIG. 7.

Figure 15:
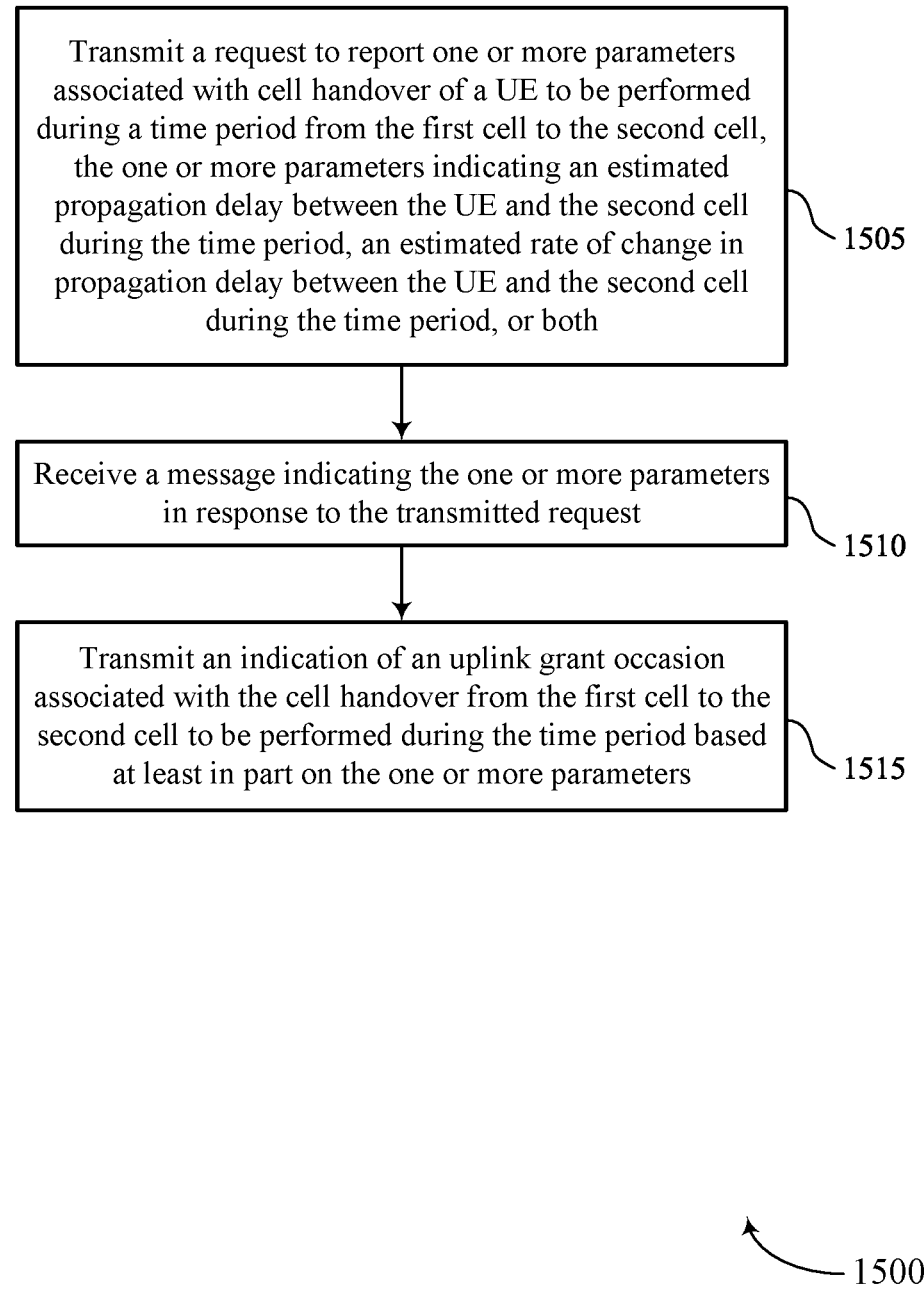

FIG. 15 shows a flowchart illustrating a method 1500 that supports techniques for handover in non-terrestrial networks in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both. The operations of 1505 may be performed in accordance with examples as disclosed herein. In some examples, aspects of the operations of 1505 may be performed by a handover request manager 1125 as described with reference to FIG. 11.

At 1510, the method may include receiving a message indicating the one or more parameters in response to the transmitted request. The operations of 1510 may be performed in accordance with examples as disclosed herein. In some examples, aspects of the operations of 1510 may be performed by a parameters manager 1130 as described with reference to FIG. 11.

At 1515, the method may include transmitting an indication of an uplink grant occasion associated with the cell handover from the first cell to the second cell to be performed during the time period based on the one or more parameters. The operations of 1515 may be performed in accordance with examples as disclosed herein. In some examples, aspects of the operations of 1515 may be performed by a grant manager 1135 as described with reference to FIG. 11.

Figure 16:
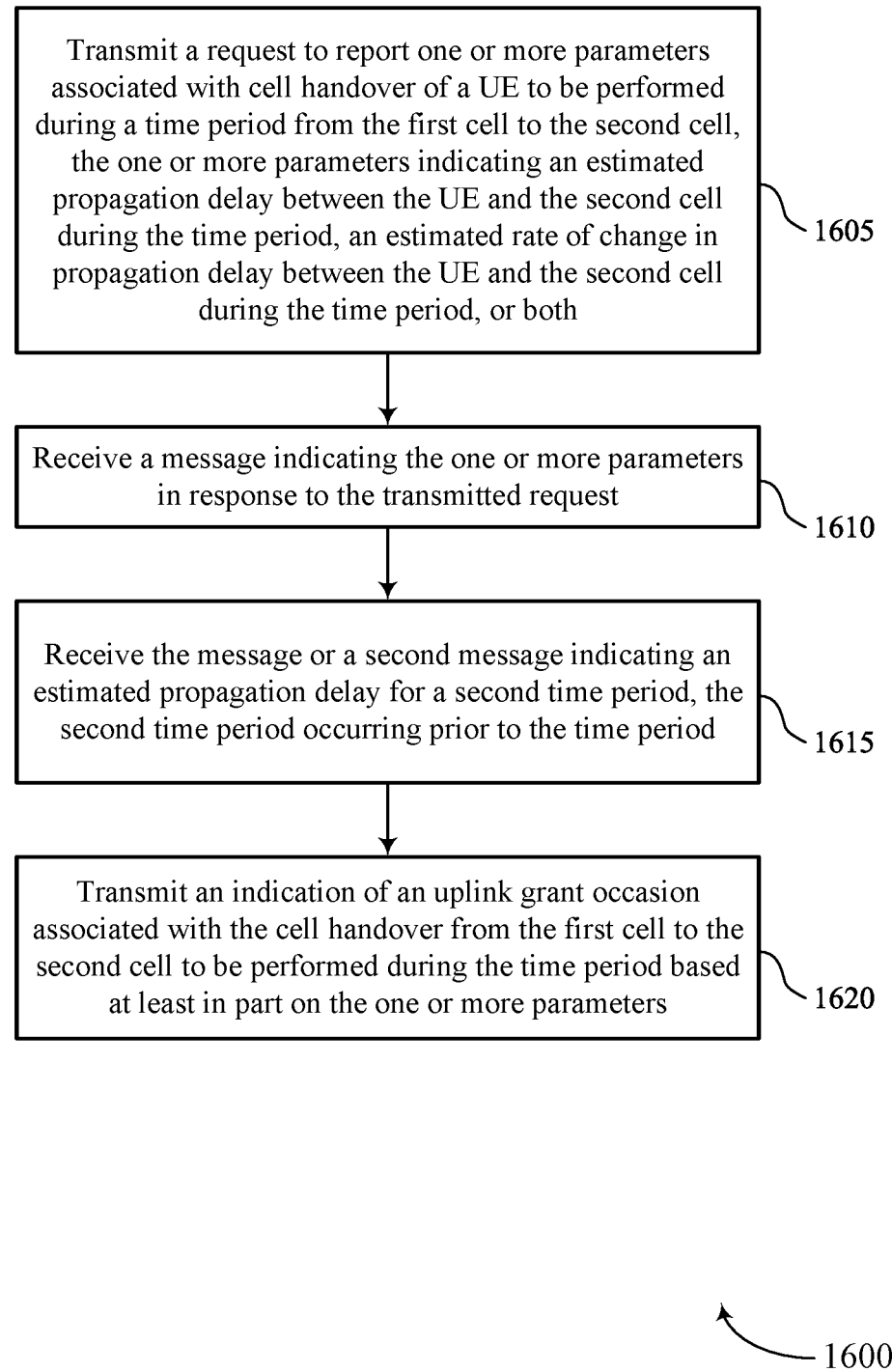

FIG. 16 shows a flowchart illustrating a method 1600 that supports techniques for handover in non-terrestrial networks in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both. The operations of 1605 may be performed in accordance with examples as disclosed herein. In some examples, aspects of the operations of 1605 may be performed by a handover request manager 1125 as described with reference to FIG. 11.

At 1610, the method may include receiving a message indicating the one or more parameters in response to the transmitted request. The operations of 1610 may be performed in accordance with examples as disclosed herein. In some examples, aspects of the operations of 1610 may be performed by a parameters manager 1130 as described with reference to FIG. 11.

At 1615, the method may include receiving the message or a second message indicating an estimated propagation delay for a second time period, the second time period occurring prior to the time period. The operations of 1615 may be performed in accordance with examples as disclosed herein. In some examples, aspects of the operations of 1615 may be performed by a parameters manager 1130 as described with reference to FIG. 11.

At 1620, the method may include transmitting an indication of an uplink grant occasion associated with the cell handover from the first cell to the second cell to be performed during the time period based on the one or more parameters. The operations of 1620 may be performed in accordance with examples as disclosed herein. In some examples, aspects of the operations of 1620 may be performed by a grant manager 1135 as described with reference to FIG. 11.

The following provides an overview of aspects of the present disclosure:

Aspect 1: A method for wireless communications at a UE, comprising: receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both; transmitting, to the first cell, a message indicating the one or more parameters in response to receiving the request; and receiving, from the first cell, an indication of an uplink grant occasion associated with the cell handover from the first cell to the second cell to be performed during the time period based at least in part on the one or more parameters.

Aspect 2: The method of aspect 1, further comprising: transmitting the message or a second message indicating an estimated propagation delay for a second time period, the second time period occurring prior to the time period.

Aspect 3: The method of any of aspects 1 through 2, further comprising: transmitting the message indicating the one or more parameters indicating a location of the UE, a change in position of the UE, a velocity of the UE, a position of the first cell, a position of the second cell, or any combination thereof.

Aspect 4: The method of any of aspects 1 through 3, further comprising: receiving a second message or the request indicating an ephemeris of the second cell, a timing advance associated with the second cell, a time offset associated with the second cell, or any combination thereof, wherein transmitting the message indicating the one or more parameters is based at least in part on receiving the second message.

Aspect 5: The method of any of aspects 1 through 4, further comprising: receiving a second message indicating an uplink resource for sending a report to the first cell, the uplink resource occurring prior to the time period.

Aspect 6: The method of any of aspects 1 through 5, further comprising: receiving a second request to perform a measurement of a synchronization signal block of the second cell.

Aspect 7: The method of aspect 6, further comprising: receiving a second message indicating one or more measurement parameters, the one or more measurement parameters indicating a synchronization signal block measurement timing configuration, a measurement gap, a measurement time, or a combination thereof; and performing the measurement of the synchronization signal block in accordance with the one or more measurement parameters.

Aspect 8: The method of any of aspects 1 through 7, further comprising: determining a handover time associated with the cell handover based at least in part on the first cell being one of an earth fixed cell or an earth moving cell.

Aspect 9: The method of any of aspects 1 through 8, further comprising: receiving a second message indicating a timing advance for the second cell for the time period.

Aspect 10: The method of aspect 9, further comprising: determining that a difference between a calculated timing advance and the timing advance indicated by the second message satisfies a threshold; and transmitting, to the second cell, a first message of a random access channel procedure based at least in part on the satisfied threshold.

Aspect 11: The method of any of aspects 1 through 10, further comprising: transmitting, to the second cell, a first message of a random access channel procedure based at least in part on the time period elapsing.

Aspect 12: The method of any of aspects 1 through 11, further comprising: determining whether an initial timing error for timing advance is within half of a cyclic prefix (CP) for a target cell; and releasing the uplink grant occasion or a handover resource based at least in part on determining the initial timing error is not within half of the CP for the target cell.

Aspect 13: The method of any of aspects 1 through 12, further comprising: transmitting one or more messages in accordance with a feedback type associated with the uplink grant occasion.

Aspect 14: The method of any of aspects 1 through 13, further comprising: determining that one or more parameters satisfy one or more thresholds, the one or more parameters comprising a timing advance, a location of the UE, a quantity of uplink grant occasions including the uplink grant occasion, a valid time window associated with the uplink grant occasion, or any combination thereof; and transmitting a first message of a random access channel procedure based at least in part on the satisfied one or more thresholds.

Aspect 15: A method for wireless communications at a network entity associated with a first cell, a second cell, or both, comprising: transmitting a request to report one or more parameters associated with cell handover of a UE to be performed during a time period from the first cell to the second cell, the one or more parameters indicating an estimated propagation delay between the UE and the second cell during the time period, an estimated rate of change in propagation delay between the UE and the second cell during the time period, or both; receiving a message indicating the one or more parameters in response to the transmitted request; and transmitting an indication of an uplink grant occasion associated with the cell handover from the first cell to the second cell during to be performed during the time period based at least in part on the one or more parameters.

Aspect 16: The method of aspect 15, further comprising: receiving the message or a second message indicating an estimated propagation delay for a second time period, the second time period occurring prior to the time period.

Aspect 17: The method of any of aspects 15 through 16, further comprising: receiving the message indicating the one or more parameters indicating a location of the UE, a change in position of the UE, a velocity of the UE, a position of the first cell, a position of the second cell, or any combination thereof.

Aspect 18: The method of any of aspects 15 through 17, further comprising: transmitting a second message or the request indicating an ephemeris of the second cell, a timing advance associated with the second cell, a time offset associated with the second cell, or any combination thereof, wherein transmitting the message indicating the one or more parameters is based at least in part on receiving the second message.

Aspect 19: The method of any of aspects 15 through 18, further comprising: transmitting a second message indicating an uplink resource for sending a report to the first cell, the uplink resource occurring prior to the time period.

Aspect 20: The method of any of aspects 15 through 19, further comprising: transmitting a second request to perform a measurement of a synchronization signal block of the second cell.

Aspect 21: The method of aspect 20, further comprising: transmitting a second message indicating one or more measurement parameters, the one or more measurement parameters indicating a synchronization signal block measurement timing configuration, a measurement gap, a measurement time, or a combination thereof.

Aspect 22: The method of any of aspects 15 through 21, further comprising: determining a handover time associated with the cell handover based at least in part on the first cell being one of an earth fixed cell or an earth moving cell.

Aspect 23: The method of any of aspects 15 through 22, further comprising: transmitting a second message indicating a timing advance for the second cell for the time period.

Aspect 24: The method of aspect 23, further comprising: receiving a first message of a random access channel procedure based at least in part on a difference between a timing advance of the UE and the timing advance indicated by the second message satisfying a threshold.

Aspect 25: The method of any of aspects 15 through 24, further comprising: receiving a first message of a random access channel procedure based at least in part on the time period elapsing.

Aspect 26: The method of any of aspects 15 through 25, further comprising: failing to receive an uplink message via the uplink grant occasion or a handover resource based at least in part on an initial timing error for a timing advance not being within half of a cyclic prefix (CP) of a target cell.

Aspect 27: The method of any of aspects 15 through 26, further comprising: receiving one or more messages in accordance with a feedback type associated with the uplink grant occasion.

Aspect 28: The method of any of aspects 15 through 27, further comprising: receiving a first message of a random access channel procedure based at least in part on one or more parameters satisfying one or more thresholds, the one or more parameters comprising a timing advance, a location of the UE, a quantity of uplink grant occasions including the uplink grant occasion, a valid time window associated with the uplink grant occasion, or any combination thereof.

Aspect 29: An apparatus for wireless communications at a UE, comprising a processor; memory coupled with the processor; and instructions stored in the memory and executable by the processor to cause the apparatus to perform a method of any of aspects 1 through 14.

Aspect 30: An apparatus for wireless communications at a UE, comprising at least one means for performing a method of any of aspects 1 through 14.

Aspect 31: A non-transitory computer-readable medium storing code for wireless communications at a UE, the code comprising instructions executable by a processor to perform a method of any of aspects 1 through 14.

Aspect 32: An apparatus for wireless communications at a network entity associated with a first cell, comprising a processor; memory coupled with the processor; and instructions stored in the memory and executable by the processor to cause the apparatus to perform a method of any of aspects 15 through 28.

Aspect 33: An apparatus for wireless communications at a network entity associated with a first cell, comprising at least one means for performing a method of any of aspects 15 through 28.

Aspect 34: A non-transitory computer-readable medium storing code for wireless communications at a network entity associated with a first cell, the code comprising instructions executable by a processor to perform a method of any of aspects 15 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both;
   transmitting, to the first cell, a message indicating the one or more parameters in response to receiving the request; and
   receiving, from the first cell, an indication of an uplink grant occasion associated with the cell handover from the first cell to the second cell to be performed during the time period based at least in part on the one or more parameters.

2. The method of claim 1, further comprising:
   transmitting the message or a second message indicating an estimated propagation delay for a second time period, the second time period occurring prior to the time period.

3. The method of claim 1, further comprising:
   transmitting the message indicating the one or more parameters indicating a location of the UE, a change in position of the UE, a velocity of the UE, a position of the first cell, a position of the second cell, or any combination thereof.

4. The method of claim 1, further comprising:
   receiving a second message or the request indicating an ephemeris of the second cell, a timing advance associated with the second cell, a time offset associated with the second cell, or any combination thereof, wherein transmitting the message indicating the one or more parameters is based at least in part on receiving the second message.

5. The method of claim 1, further comprising:
   receiving a second message indicating an uplink resource for sending a report to the first cell, the uplink resource occurring prior to the time period.

6. The method of claim 1, further comprising:
   receiving a second request to perform a measurement of a synchronization signal block of the second cell.

7. The method of claim 6, further comprising:
   receiving a second message indicating one or more measurement parameters, the one or more measurement parameters indicating a synchronization signal block measurement timing configuration, a measurement gap, a measurement time, or a combination thereof; and
   performing the measurement of the synchronization signal block in accordance with the one or more measurement parameters.

8. The method of claim 1, further comprising:
   determining a handover time associated with the cell handover based at least in part on the first cell being one of an earth fixed cell or an earth moving cell.

9. The method of claim 1, further comprising:
   receiving a second message indicating a timing advance for the second cell for the time period.

10. The method of claim 9, further comprising:
    determining that a difference between a calculated timing advance and the timing advance indicated by the second message satisfies a threshold; and transmitting, to the second cell, a first message of a random access channel procedure based at least in part on the satisfied threshold.

11. The method of claim 1, further comprising:
transmitting, to the second cell, a first message of a random access channel procedure based at least in part on the time period elapsing.

12. The method of claim 1, further comprising:
determining whether an initial timing error for timing advance is within half of a cyclic prefix (CP) for a target cell; and
releasing the uplink grant occasion or a handover resource based at least in part on determining the initial timing error is not within half of the CP for the target cell.

13. The method of claim 1, further comprising:
transmitting one or more messages in accordance with a feedback type associated with the uplink grant occasion.

14. The method of claim 1, further comprising:
determining that one or more parameters satisfy one or more thresholds, the one or more parameters comprising a timing advance, a location of the UE, a quantity of uplink grant occasions including the uplink grant occasion, a valid time window associated with the uplink grant occasion, or any combination thereof; and
transmitting a first message of a random access channel procedure based at least in part on the satisfied one or more thresholds.

15. A method for wireless communications at a network entity associated with a first cell, a second cell, or both, comprising:
transmitting a request to report one or more parameters associated with cell handover of a user equipment (UE) to be performed during a time period from the first cell to the second cell, the one or more parameters indicating an estimated propagation delay between the UE and the second cell during the time period, an estimated rate of change in propagation delay between the UE and the second cell during the time period, or both;
receiving a message indicating the one or more parameters in response to the transmitted request; and
transmitting an indication of an uplink grant occasion associated with the cell handover from the first cell to the second cell to be performed during the time period based at least in part on the one or more parameters.

16. The method of claim 15, further comprising:
receiving the message or a second message indicating an estimated propagation delay for a second time period, the second time period occurring prior to the time period.

17. The method of claim 15, further comprising:
receiving the message indicating the one or more parameters indicating a location of the UE, a change in position of the UE, a velocity of the UE, a position of the first cell, a position of the second cell, or any combination thereof.

18. The method of claim 15, further comprising:
transmitting a second message or the request indicating an ephemeris of the second cell, a timing advance associated with the second cell, a time offset associated with the second cell, or any combination thereof, wherein transmitting the message indicating the one or more parameters is based at least in part on receiving the second message.

19. The method of claim 15, further comprising:
transmitting a second message indicating an uplink resource for sending a report to the first cell, the uplink resource occurring prior to the time period.

20. The method of claim 15, further comprising:
transmitting a second request to perform a measurement of a synchronization signal block of the second cell.

21. The method of claim 20, further comprising:
transmitting a second message indicating one or more measurement parameters, the one or more measurement parameters indicating a synchronization signal block measurement timing configuration, a measurement gap, a measurement time, or a combination thereof.

22. The method of claim 15, further comprising:
determining a handover time associated with the cell handover based at least in part on the first cell being one of an earth fixed cell or an earth moving cell.

23. The method of claim 15, further comprising:
transmitting a second message indicating a timing advance for the second cell for the time period.

24. The method of claim 23, further comprising:
receiving a first message of a random access channel procedure based at least in part on a difference between a timing advance of the UE and the timing advance indicated by the second message satisfying a threshold.

25. The method of claim 15, further comprising:
receiving a first message of a random access channel procedure based at least in part on the time period elapsing.

26. The method of claim 15, further comprising:
failing to receive an uplink message via the uplink grant occasion or a handover resource based at least in part on an initial timing error for a timing advance not being within half of a cyclic prefix (CP) of a target cell.

27. The method of claim 15, further comprising:
receiving one or more messages in accordance with a feedback type associated with the uplink grant occasion.

28. The method of claim 15, further comprising:
receiving a first message of a random access channel procedure based at least in part on one or more parameters satisfying one or more thresholds, the one or more parameters comprising a timing advance, a location of the UE, a quantity of uplink grant occasions including the uplink grant occasion, a valid time window associated with the uplink grant occasion, or any combination thereof.

29. An apparatus for wireless communications at a user equipment (UE), comprising:
a processor;
memory coupled with the processor; and
instructions stored in the memory and executable by the processor to cause the apparatus to:
receive, from a first cell, a request to report one or more parameters associated with cell handover of the UE to be performed during a time period from the first cell to a second cell, the one or more parameters indicating an estimated propagation delay between the UE and the second cell during the time period, an estimated rate of change in propagation delay between the UE and the second cell during the time period, or both;
transmit, to the first cell, a message indicating the one or more parameters in response to receiving the request; and receive, from the first cell, an indication of an uplink grant occasion associated with the cell handover from the first cell to the second cell to be performed during the time period based at least in part on the one or more parameters.

30. An apparatus for wireless communications at a network entity associated with a first cell, a second cell, or both, comprising:

a processor;

memory coupled with the processor; and instructions stored in the memory and executable by the processor to cause the apparatus to:

transmit a request to report one or more parameters associated with cell handover of a user equipment (UE) to be performed during a time period from the first cell to the second cell, the one or more parameters indicating an estimated propagation delay between the UE and the second cell during the time period, an estimated rate of change in propagation delay between the UE and the second cell during the time period, or both;

receive a message indicating the one or more parameters in response to the transmitted request; and transmit an indication of an uplink grant occasion associated with the cell handover from the first cell to the second cell to be performed during the time period based at least in part on the one or more parameters.

* * * * *